US009317240B2

(12) United States Patent
Lee et al.

(10) Patent No.: US 9,317,240 B2
(45) Date of Patent: Apr. 19, 2016

(54) IMAGE DISPLAY DEVICE AND METHOD OF CONTROLLING THE SAME

(71) Applicant: LG ELECTRONICS INC., Seoul (KR)

(72) Inventors: Donghee Lee, Seoul (KR); Jinho Hyun, Seoul (KR); Ssangsoo Lee, Seoul (KR); Sungwoo Han, Seoul (KR); Kihyoung Cho, Seoul (KR); Mingoo Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 13/750,348

(22) Filed: Jan. 25, 2013

(65) Prior Publication Data
US 2013/0210488 A1 Aug. 15, 2013

(30) Foreign Application Priority Data

Feb. 15, 2012 (KR) .................. 10-2012-0015156
Oct. 29, 2012 (KR) .................. 10-2012-0120471

(51) Int. Cl.
*H04B 1/38* (2015.01)
*G06F 3/14* (2006.01)
*H04N 21/422* (2011.01)
(Continued)

(52) U.S. Cl.
CPC ............... *G06F 3/14* (2013.01); *G06F 9/4445* (2013.01); *H04N 21/4122* (2013.01); *H04N 21/4126* (2013.01); *H04N 21/42212* (2013.01); *H04N 21/42224* (2013.01); *H04N 21/4312* (2013.01); *G06F 3/147* (2013.01); *G06F 3/1454* (2013.01); *G09G 2330/021* (2013.01); *G09G 2360/08* (2013.01); *G09G 2370/20* (2013.01)

(58) Field of Classification Search
CPC .......... H04M 1/7253; H04M 2250/16; H04M 2250/02; H04M 2250/22; G06F 8/61; G06F 3/14; G06F 3/1454; G06F 17/3087; G06F 1/1626; G06F 1/1662; G06F 3/0233; G06F 3/048; G06F 3/1423; G06F 3/1431
USPC .......................................................... 455/507
See application file for complete search history.

(56) References Cited

U.S. PATENT DOCUMENTS 8,588,740 B2 * 11/2013 Kim .................. G06F 21/84
345/4
2004/0046783 A1 * 3/2004 Montebovi .......... H04M 1/7253
715/730

(Continued)

FOREIGN PATENT DOCUMENTS

CN 101951515 A 1/2011
CN 102077158 A 5/2011
(Continued)

OTHER PUBLICATIONS

M. Pinola, "How to Copy and Paste Files to a USB Memory Stick," Lifehacker, XP002725995, Jul. 4, 2011, 4 pages.

*Primary Examiner* — Ajibola Akinyemi
(74) *Attorney, Agent, or Firm* — Birch, Stewart, Kolasch & Birch, LLP

(57) ABSTRACT

Provided is a method of controlling an image display device. The method includes: confirming whether first and second terminals are connected to the image display device; when the first and second terminals are connected to the image display device, receiving application information of the first terminal and application information of the second terminal; and displaying the received application information of each terminal.

15 Claims, 25 Drawing Sheets

(51) Int. Cl.
  *H04N 21/41* (2011.01)
  *H04N 21/431* (2011.01)
  *G06F 9/44* (2006.01)
  *G06F 3/147* (2006.01)

(56) References Cited

U.S. PATENT DOCUMENTS

2006/0062149 A1* 3/2006 Bednasz ........... H04M 1/72522
                                                  370/235
2007/0089143 A1   4/2007 LeFevre et al.
2008/0256471 A1  10/2008 Okamoto
2009/0233643 A1*  9/2009 Nishimura ............. G08C 23/04
                                                  455/559
2009/0249204 A1* 10/2009 Sugiura ........................ 715/708
2011/0096230 A1   4/2011 Komiya et al.
2011/0296339 A1  12/2011 Kang

FOREIGN PATENT DOCUMENTS

CN       102262503 A    11/2011
EP       2 482 565 A1    8/2012

* cited by examiner

Fig. 7
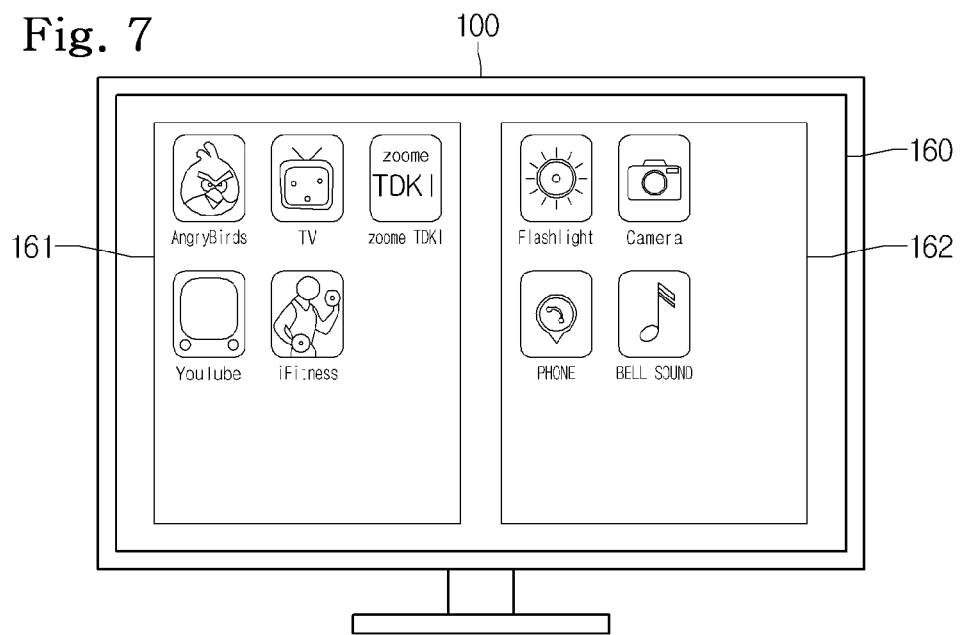
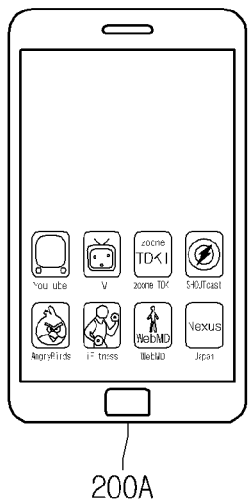
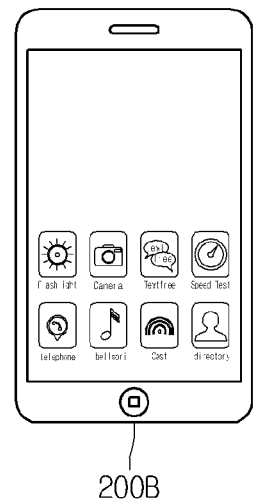

IMAGE DISPLAY DEVICE AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2012-0015156 (filed on Feb. 15, 2012) and No. 10-2012-0120471 (filed on Oct. 29, 2012), which are hereby incorporated by reference in its entirety.

BACKGROUND

The present invention relates to an image display device and a control method thereof.

The image display device is a device having a function for displaying an image that a user can watch. Recently, a technique for running application on an image display device is being developed, which is installed in a user's mobile communication terminal connected to the image display device.

When the image display device is connected to the mobile communication terminal, a user may watch the larger display screen of the image display device than that of the mobile communication terminal, and also may run the application installed in the mobile communication terminal on the image display device, so that the convenience of the user may be increased.

However, typically, a screen of a display unit of a terminal connected to the image display device is only displayed as it is on that of an image display device and there are limitations in controlling applications installed in the terminal.

SUMMARY

Embodiments provide an image display device for displaying information on a terminal connected to the image display device and actively controlling the displayed information on the terminal, and a control method thereof.

Embodiments also provide an image display device for collecting application information on a terminal connected to the image display device in order to integratedly managing the collected application information, and a control method thereof.

In one embodiment, a method of controlling an image display device is provided. The method includes: confirming whether first and second terminals are connected to the image display device; when the first and second terminals are connected to the image display device, receiving application information of the first terminal and application information of the second terminal; and displaying the received application information of each terminal.

In another embodiment, an image display device includes: a display unit; and a control unit confirming that first and second terminal are connected to the image display device, receiving application information of the first terminal and application information of the second terminal when the first and second terminals are connected to the image display device, and displaying the received application information on each of the first and second terminals.

The details of one or more embodiments are set forth in the accompanying drawings and the description below. Other features will be apparent from the description and drawings, and from the claims.

BRIEF DESCRIPTION OF THE DRAWINGS

FIG. 7 is a view illustrating that while an image display device is connected to a first terminal and a second terminal, after applications installed in the first terminal and the second terminal are compared, the icon of an application not installed in the first terminal and the second terminal is displayed on a display unit.

DETAILED DESCRIPTION OF THE EMBODIMENTS

Hereinafter, preferred embodiments of the present invention will be described in more detail with reference to the accompanying drawings, in order to make those skilled in the art easily implement them.

Hereinafter, application may mean an application program running on the operating system of a terminal, and especially means, only an application program that a user directly uses among application programs running on an operating system.

In more detail, application may mean an application program for smart device, which is installed in a smart device such as a smart phone and a smart TV to help user's ease use and have an entertainment function.

Figure 1:
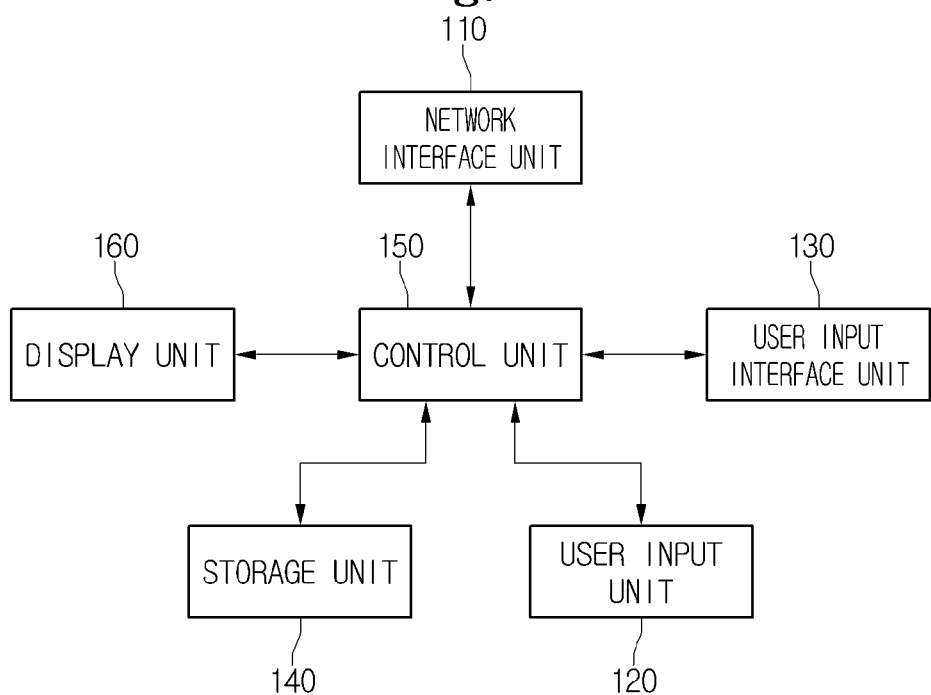
FIG. 1 is a block diagram illustrating a structure of an image display device according to an embodiment of the present invention.

FIG. 1 is a block diagram illustrating a structure of an image display device according to an embodiment of the present invention.

The image display device 100 according to an embodiment of the present invention, for example, as an image display device having a computer supporting function in addition to a broadcast receiving function, may have a convenient interface such as a handwriting type input device, a touch screen, or a spatial remote controller by adding an internet function while fulfilling the broadcast receiving function. Moreover, the image display device 100 may perform functions such as e-mail, web browsing, banking, or gaming in access to an internet and computer with the support of a wired or wireless internet function. A standardized general OS may be used for such various functions.

Accordingly, for example, since the image display device 100 of the present invention adds or deletes various applications on a general OS kernel without limitations, it may perform various user-friendly functions. The image display device, more specifically, for example, may be a network TV, an HBBTV, and a smart TV, and if necessary, may be applicable to a smart phone.

The image display device 100 may include a network interface unit 110, a user input unit 120, a user input interface unit 130, a storage unit 140, a control unit 150, and a display unit 160.

The network interface unit 110 may receive a packet from a network, and may transmit a packet to a network. That is, the network interface unit 110 may receive service and contents from a service provider via a network. The contents may include audio files, video files, and applications, but are not limited thereto.

The user input unit 120 may include a keypad, a button, a touch pad, or a touch screen. A user may manipulate the user input unit 120, and then may input a command relating to application execution. When the user input unit 120 includes a hard key button, a user may input a command relating to application execution through a push operation of the hard key button.

When the user input unit 120 includes a touch screen, a user may input a command relating to application execution by touching a soft key of the touch screen. Additionally, the user input unit 120 may include various kinds of input means that a user can manipulate such as a scroll key or a jog key, and this embodiment does not limit the scope of the present invention.

Through the user input interface unit 130, a user may deliver an inputted signal to the control unit 150, or may deliver a signal from the control unit 150 to a user. For example, the user input interface unit 130 may receive a control signal such as power on/off, channel selection, and screen setting from a remote control device and may process the received signal according to various communication methods such as a radio frequency (RF) communication method or an infrared (IR) communication method, or may process and transmit a control signal from the control unit 150 to the remote control device.

The remote control device transmits a user input relating to application execution to the user input interface unit 130. For this, the remote control device may use a Bluetooth, RF communication, Ultra Wideband (UWB), or ZigBee type.

Moreover, the user input interface unit 130 may deliver to the control unit 150 a control signal inputted through the user input unit 120 including a local key such as a power key, a channel key, a volume key, and a setting value.

The user input interface unit 130 may deliver a control signal, inputted from a sensing unit (not shown) for sensing a user's gesture, to the control unit 150, or may transmit a signal from the control unit 150 to a sensing unit (not shown). Moreover, the sensing unit (not shown) may include a touch sensor, a voice sensor, a position sensor, and a motion sensor.

The storage unit 140 may store programs for processing and controlling each signal in the control unit 150, and also may store signal-processed image, voice, data signals.

The storage unit 140 may perform a function for temporarily storing image, voice, or data signals inputted from the network interface unit 110, and also may store information on a predetermined image through a channel memory function.

Especially, the storage unit 140 may store information on executed application when the application installed in a terminal is executed in the image display device 100.

The storage unit 140 may include at least one type of storage medium among a flash memory type, a hard disk type, a multimedia card micro type, a card type memory (for example, SD or XD memory), a RAM type, and a ROM type such as EEPROM.

The display unit 160 may convert an image signal, data signal, and OSD signal processed in the control unit 150 and an image signal and data signal received from an external device, into R, G, and B signals in order to generate a driving signal.

The display unit 160 may display application installed in a terminal connected to the image display device 100.

When the image display device 100 is connected to a plurality of terminals, the display unit 160 may display applications, which are installed in the plurality of terminals, on a divided area of the display unit 160 for each terminal.

The display unit 160 may include a PDP, an LCD, an OLED, a flexible display, and a 3D display, or may include a touch screen in order to use it as an input device in addition to an output device.

The image display device 100 may play contents files stored in the storage unit 140 (such as movie files, still image files, music files, document files, and application files) and then may provide them to a user.

The control unit 150 may control general operations of the image display device 100.

Additionally, the control unit 150 may control the image display device 100 according to a user command inputted through the user input interface unit 130 or an internal program, and may access a network to download application or an application list that a user wants in the image display device 100.

Moreover, the control unit 150 may control the display unit 160 in order to display an image, and for example, may control a broadcast image inputted through a tuner, an external input image inputted through an external device, an image inputted through the network interface unit 110, or an image stored in the storage unit 140 to be displayed on the display unit 160. In this case, an image displayed on the display unit 160 may be a still image, a video, a 2D image, or a 3D image.

Additionally, the control unit 150 may control contents stored in the image display device 100, received broadcast contents, or external input contents inputted through an external to be played. The contents may be in various formats such as a broadcast image, an external input image, an audio file, a still image, an accessed web screen, and a document file.

When a terminal is connected to the image display unit 100, the control unit 150 may control the icon of an application installed in the terminal to be displayed on the display unit 160. The terminal may include a typical mobile phone (such as a cellular phone, a Personal Communication Service (PCS) phone, a GSM phone, a CDMA-2000 phone, and a WCDMA phone), a Portable Multimedia Player (PMP), a Personal Digital Assistants (PDA), a smart phone, a smart pad, a notebook computer, or a Mobile Broadcast System (MBS) phone, but may not be limited thereto.

When a first terminal and a second terminal are connected to the image display device 100, the control unit 150 displays icons corresponding to applications installed in the first terminal and the second terminal on the display unit 160, and when an application corresponding to a selected icon among the displayed icons is redundantly installed in the first terminal and the second terminal, determination may be made on which one of the first terminal and the second terminal executes an application corresponding to the selected icon.

Then, a process of displaying application installed in a plurality of terminals connected to an image display device on the display unit 160 will be described with reference to FIGS. 2 to 5.

Figure 2:
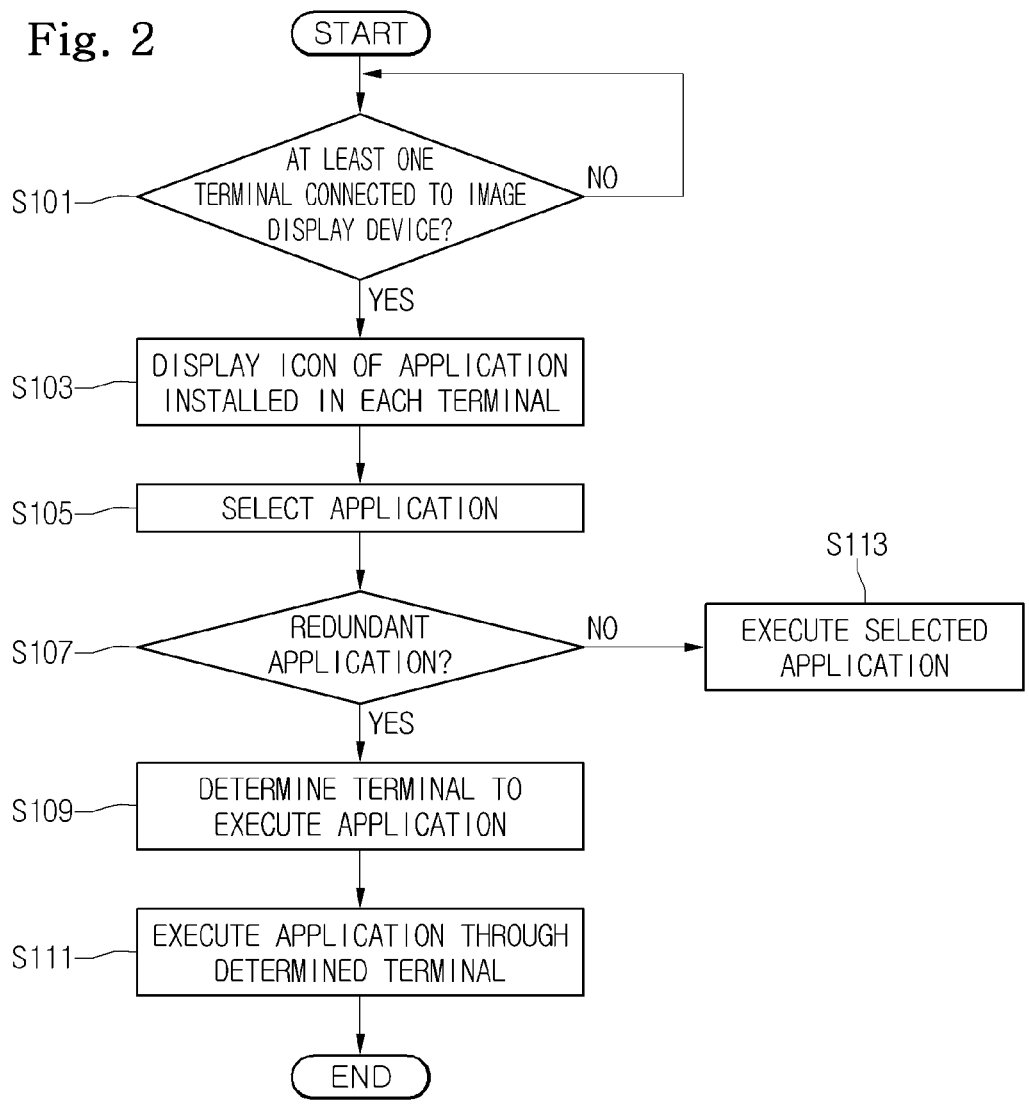
FIG. 2 is a flowchart illustrating a method of controlling an image display device according to an embodiment of the present invention.

FIG. 2 is a flowchart illustrating a method of controlling an image display device according to an embodiment of the present invention.

First, the control unit 150 confirms whether a terminal is connected to the image display device 100 in operation S101.

According to an embodiment, the control unit 150 confirms whether at least one terminal is connected to the image display device 100. That is, a plurality of terminals may be simultaneously or sequentially connected to the image display device 100.

Then, the control unit 150 displays the icon of an application, which is installed in the connected terminal, on the display unit 160 in operation S103. According to an embodiment, when an application installed in the connected terminal is redundant, the control unit 150 may recognize it, and then, may display only an icon corresponding to one application. Or, even when an application installed in the connected terminal is redundant, the control unit 150 may display all icons corresponding to the redundant application. Hereinafter, even when an application installed in a connected terminal is redundant, it is assumed that all icons of each application are displayed on the display unit 160, and this will be described.

According to an embodiment, when a plurality of terminals are connected to the image display unit 100, the control unit 150 may divide an area of the display unit 160 and then may display the icons of an application installed in each terminal on the divided areas by each terminal. In this case, the divided areas of each display unit 160 may display basic information on a corresponding terminal.

Then, the control unit 150 may select one of icons corresponding to the applications displayed on the display unit 160 through the user input unit 120 or the user input interface unit 130 in operation S105. The control unit 150 receives a command signal from a remote control device through the user input interface unit 130, and selects an application.

Then, the control unit 150 confirms whether an application corresponding to the selected icon is a redundant application simultaneously installed in each terminal in operation S107. The control unit 150 may confirm whether the selected application is redundant by comparing applications installed in each terminal.

Then, if it is confirmed that the application corresponding to the selected icon is a redundant application simultaneously installed in each terminal, the control unit 150 determines which one among the plurality of terminals executes the application in operation S109.

According to an embodiment, a decision criteria for executing an application by which terminal may be based of an application having the most excellent performance. The application having the most excellent performance may mean an application having the most recently updated version.

According to an embodiment, a decision criteria for executing an application by which terminal may be based of an application installed in a terminal having the most excellent performance. Here, the terminal having the most excellent performance may mean a terminal having the fastest data communication speed or the lowest communication disorder occurrence. The control unit 150 confirms a communication state of each terminal in real time and controls an application to be executed through the terminal having the most excellent performance.

According to an embodiment, a decision criteria for executing an application by which terminal may be based of an application of a terminal selected through the user input unit 120. For example, when first and second terminals are simultaneously connected to an image display device and the same first application is installed in each of the first ands second terminals, a user may select one among the two identical first applications through user's selection. Here, two terminals are described as one example, but more than two terminals may be connected to an image display device.

According to an embodiment, a decision criteria for executing an application by which terminal may be based of an application executed based on a charging state of each terminal. That is, the control unit 150 may execute an application installed in a terminal having the most excellent charging state in consideration of a charging state of each terminal connected to an image display device.

For example, when a battery charging percentage of the first terminal is 90% and a battery charging percentage of the second terminal is 50%, since the battery charging percentage of the first terminal is better, the control unit 150 may execute an application installed in the first terminal. While the application of the first terminal is running, if the battery charging percentage of the first terminal is reduced to 20%, the control unit 150 stops the application executed by the first terminal 200A, and then, controls the first and second terminals in order to execute the application through the second terminal 200B. Here, 20% is just an example, and its value may vary according to a user's setting.

According to an embodiment, the control unit 150 displays a charging state of each terminal on the display unit 160. A user confirms a charging state of each terminal displayed on the display unit 160, and then, selects a terminal having an excellent charging state in order to execute the application through the selected terminal.

According to an embodiment, a decision criteria for executing an application by which terminal may be based of an application installed in a terminal having a cheaper usage rate of a currently used communication type. For example, if the communication type that the first terminal currently uses is a wireless LAN (for example, WIFI) and the communication type that the second terminal currently uses is a cellular network using 3G network, since a usage rate of the wireless LAN is cheaper than that of the cellular network using 3 G network, the application executed in the image display device is the application installed in the first terminal.

According to an embodiment, when an image display device is connected to the first and second terminals, the control unit may display a communication type that the first and second terminals currently use on a display unit. A user confirms it and determines which terminal executes an application. According to an embodiment, the control unit may display which terminal uses a communication type charged by a cheaper usage rate when the first and second terminals are connected through a pop-up window. A user may select a terminal using a communication type of a cheaper usage rate by confirming the pop-up window, so that a usage rate of the terminal may be saved.

According to an embodiment, a decision criteria for executing an application by which terminal may be based of an application of a terminal having a low CPU usage. For example, it is assumed that a first terminal and a second terminal are connected to an image display device and a first application is executed through the first terminal. Additionally, it is assumed that a second application is executed through the first terminal. The first application and the second application are identical. At this point, while the first application is running through the first terminal, if a user performs a task through the first terminal besides the execution of the first application, since a data usage amount of the first terminal becomes larger, a control unit recognizes this, stops the first application executed through the first terminal, and controls the first and second terminals to perform the second application through the second terminal.

Then, the control unit 150 executes the application through the determined terminal in operation S111.

According to an embodiment, the control unit 150 may turn on/off the display screen of a terminal executing the application. That is, when the application is executed, since a user sees the application execution screen through the display unit 160 of the image display device, the user may maintain the turned on/off state of the display screen of a terminal executing the application if necessary.

If it is confirmed that the application corresponding to the selected icon is not a redundant application simultaneously installed in each terminal, the control unit 150 executes the selected application through a corresponding terminal in operation S113.

Figure 3:
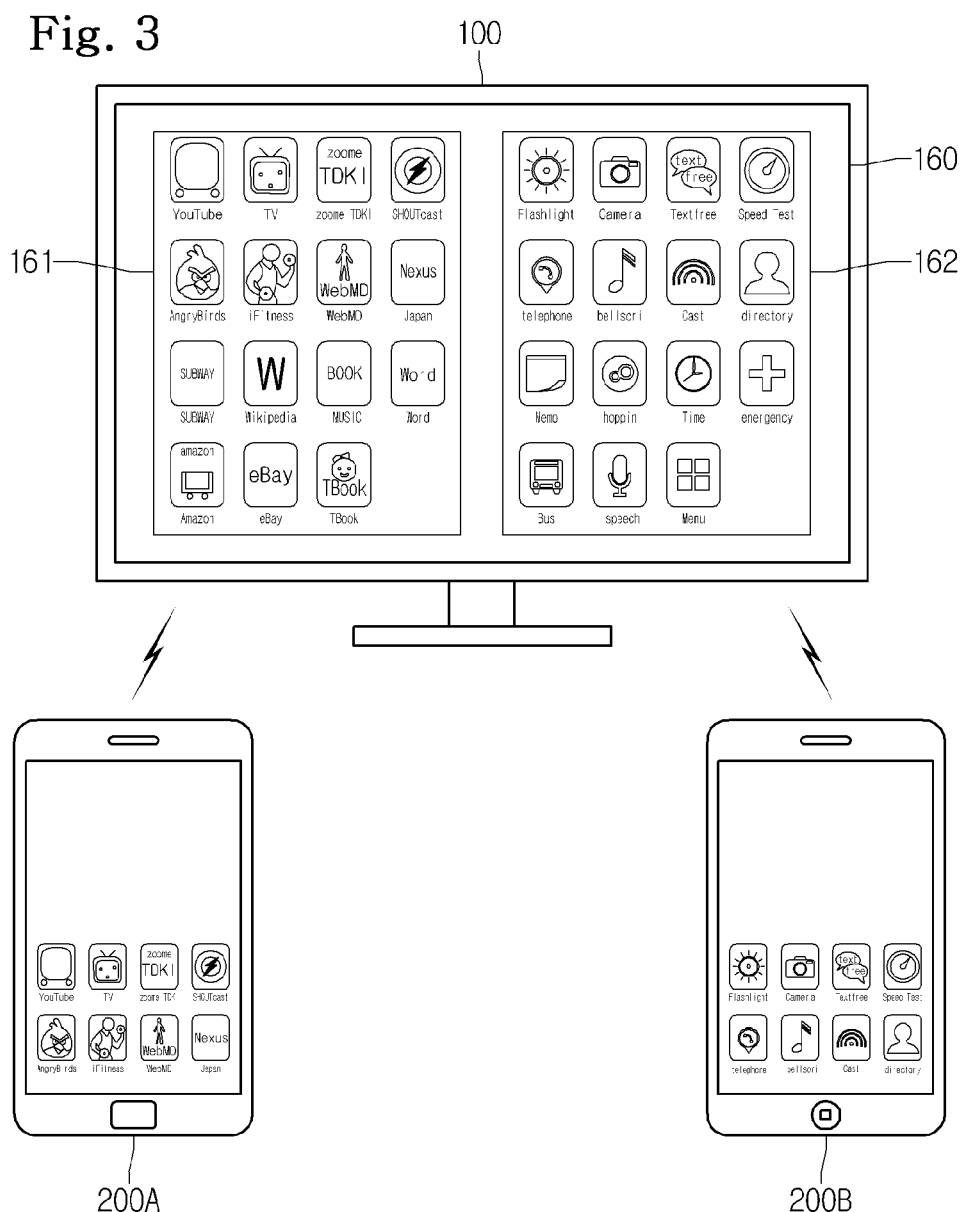
FIG. 3 is a view illustrating that while an image display device is connected to a first terminal and a second terminal, the icon of an application installed in the first terminal and the second terminal is displayed on a display unit.

FIG. 3 is a view illustrating that while an image display device 100 is connected to a first terminal 200A and a second terminal 200B, the icon of an application installed in the first terminal 200A and the second terminal 200B is displayed on a display unit 160.

Referring to FIG. 3, the first terminal 200A and the second terminal 200B are connected to the image display device 100. The display unit 160 of the image display device 100 includes a first application display area 161 and a second application display area 162. The first application display area 161 displays the icons of applications installed in the first terminal 200A and the second application display area 162 displays the icons of applications installed in the second terminal 200B.

Figure 4:
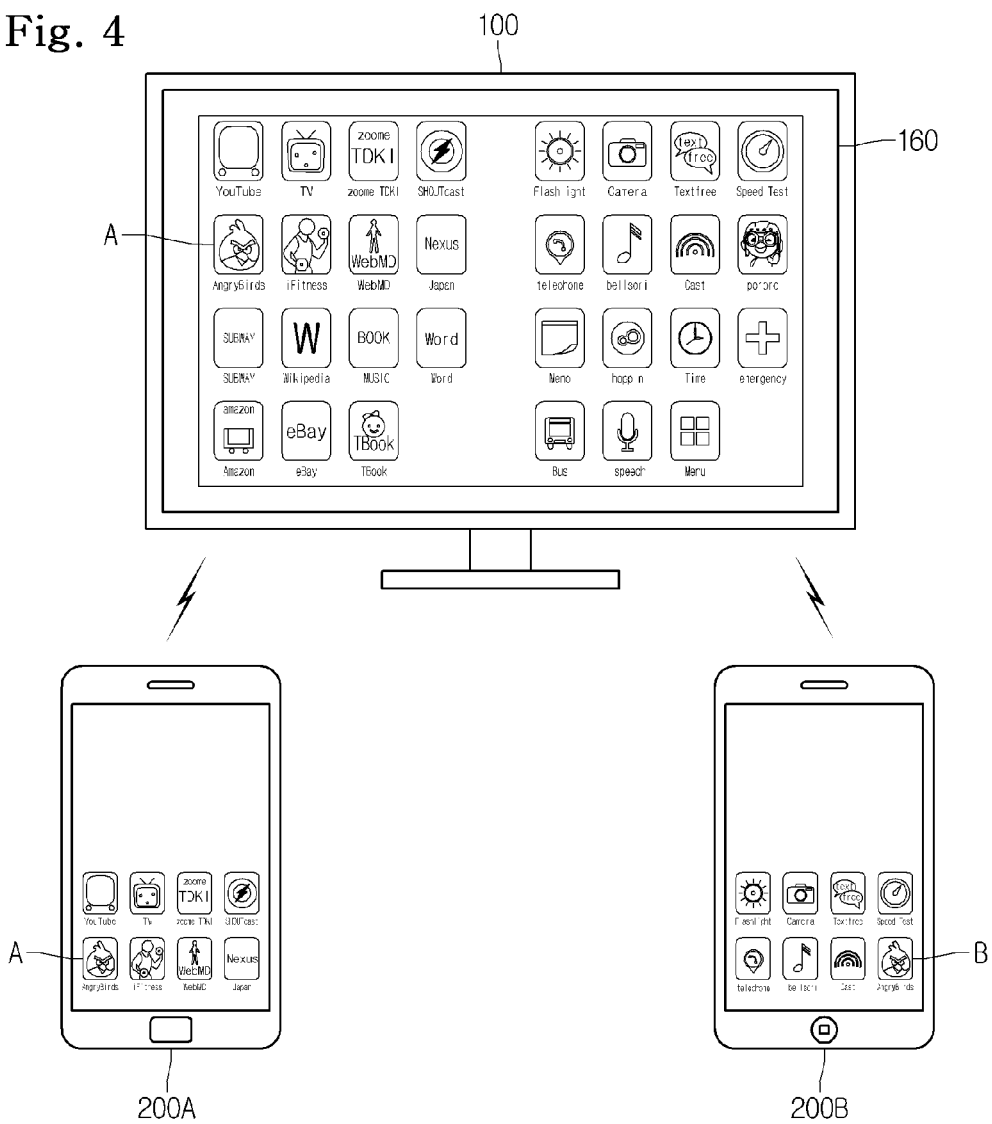
FIG. 4 is a view illustrating that while an image display device is connected to a first terminal and a second terminal, if an application installed in the first terminal and the second terminal is redundant, the icon of the most recently updated application is displayed on a display unit.

FIG. 4 is a view illustrating that while an image display device 100 is connected to a first terminal 200A and a second terminal 200B, if an application installed in the first terminal 200A and the second terminal 200B is redundant, the icon of the most recently updated application is displayed on a display unit 160.

Referring to FIG. 4, the first terminal 200A and the second terminal 200B are connected to the image display device 100. Unlike FIG. 3, the display unit 160 displays the icons of applications installed in the first terminal 200A and the second terminal 200B without divided areas. However, when a first application A among applications installed in the first terminal 200A is identical to a second application B among applications installed in the second terminal 200B, the icon of the application A having the most recently updated version is displayed on the display unit 160.

A user may use the application having the most recently updated version only through the connection of the image display device without additional processes.

Figure 5:
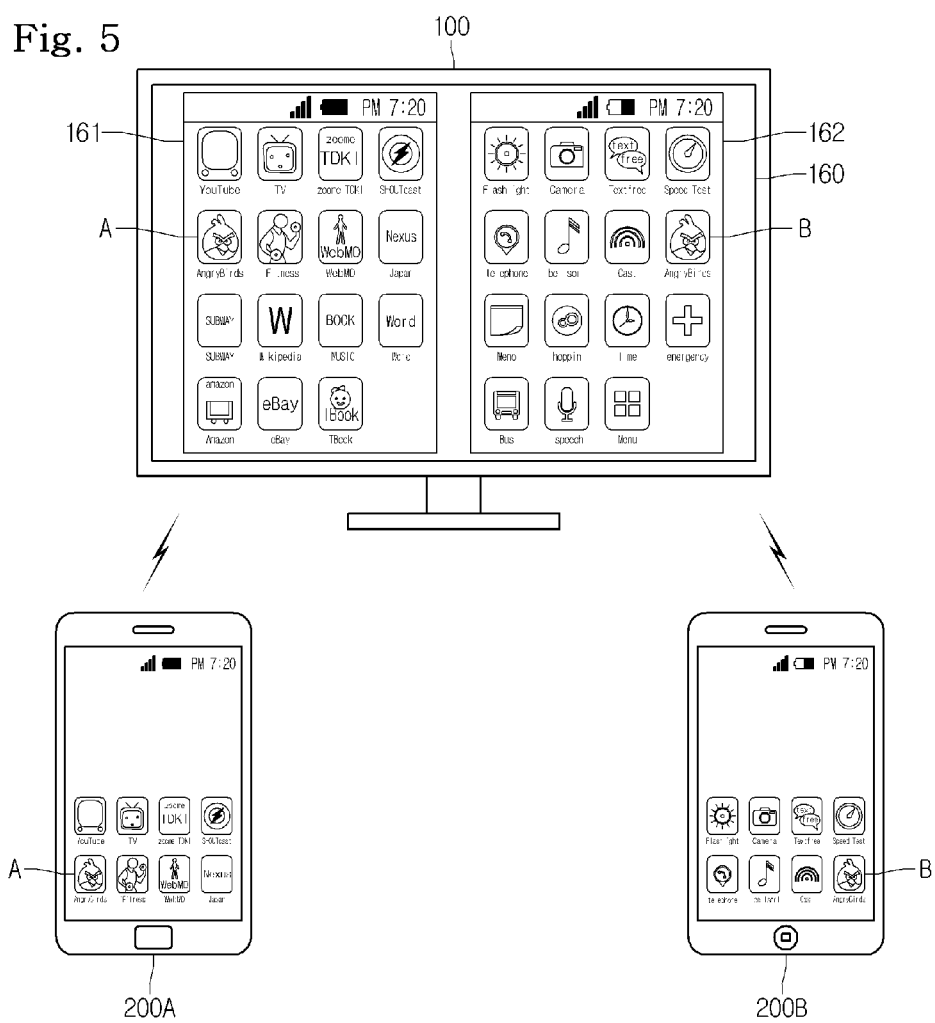
FIG. 5 is a view illustrating that while an image display device is connected to a first terminal and a second terminal, if an application installed in the first terminal and the second terminal is redundant, the icon of an application in a terminal having a better charging state is displayed on a display unit.

FIG. 5 is a view illustrating that while an image display device 100 is connected to a first terminal 200A and a second terminal 200B, if an application installed in the first terminal 200A and the second terminal 200B is redundant, the application installed in a terminal having an excellent charging state is executed.

Referring to FIG. 5, the first terminal 200A and the second terminal 200B are connected to the image display device 100. The first application display area 161 of the display unit 160 displays the icons of applications installed in the first terminal 200A and basic state information of the first terminal 200A including a charging state thereof. The second application display area 161 displays the icons of applications installed in the second terminal 200B and basic state information of the first terminal 200B including a charging state thereof. At this point, a battery charging percentage of the first terminal 200A is 90%, and a battery charging percentage of the second terminal 200B is 50%.

When a first application A among applications installed in the first terminal 200A is identical to a second application B among applications installed in the second terminal 200B, even if the icon of the second application B is selected, the first application A installed in the first terminal 200A having a better charging state is executed.

If a battery charging percentage of the first terminal 200A becomes less than that of the second terminal 200B, the second application B installed in the second terminal 200B is executed through control.

Accordingly, even if a user connects two terminals to an image display device to execute an application, a charging state is automatically considered and the application is executed. Therefore, problems due to power reduction may be prevented.

Figure 6:
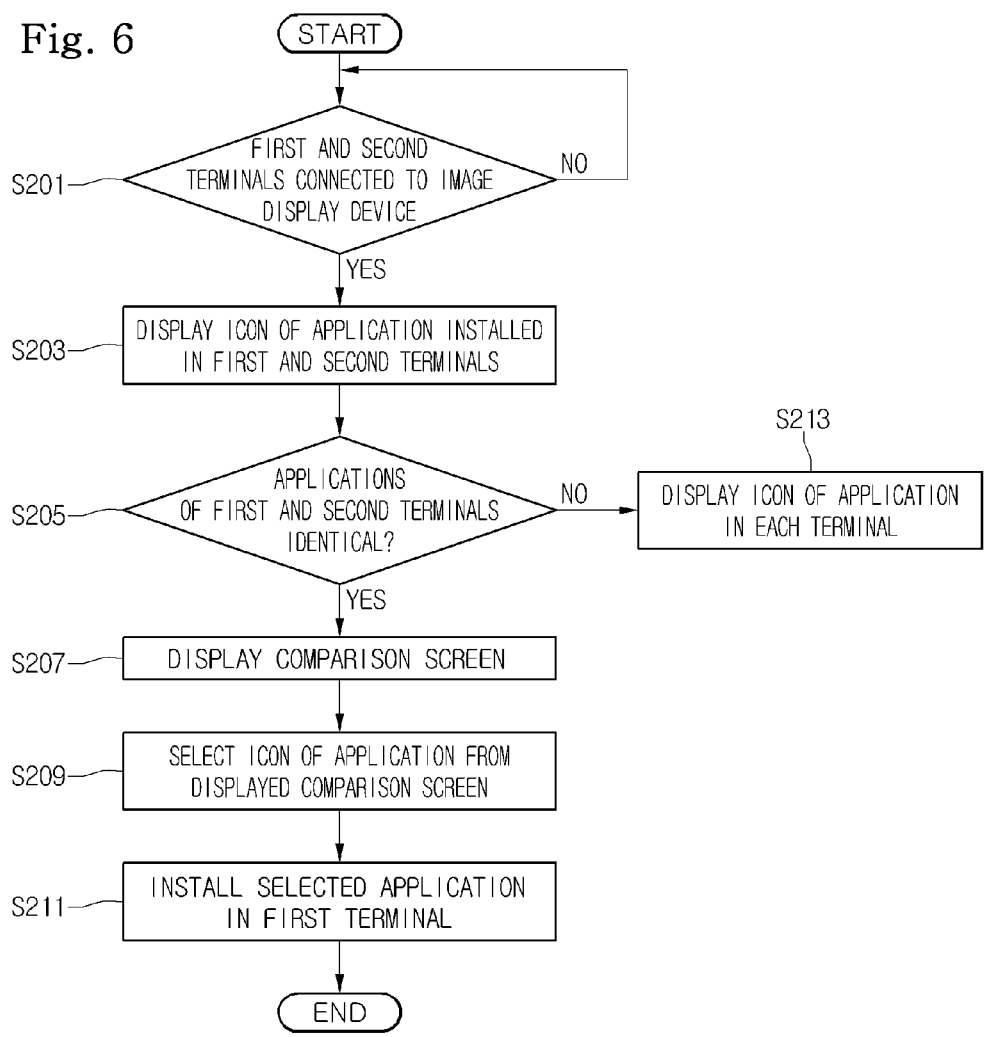
FIG. 6 is a flowchart illustrating a method of controlling an image display device according to another embodiment of the present invention.

Then, FIGS. 6 and 7 illustrate processes that while applications installed in a terminal are displayed on a display unit 160, if a specific application is installed in the first terminal 200A and is not installed in the second terminal 200B, the application installed in the first terminal 200A is installed in the second terminal 200B.

FIG. 6 is a flowchart illustrating a method of controlling an image display device according to another embodiment of the present invention.

The case that first and second terminals, i.e. two terminals, are connected to an image display device is described as one example, but the present invention is not limited thereto. Therefore, at least three terminals are connected to an image display device.

First, the control unit 150 may confirm whether the image display device is connected to the first terminal 200A and the second terminal 200B in operation S201.

Then, when it is confirmed that the image display device is connected to the first terminal 200A and the second terminal 200B, the control unit 150 displays the icons of applications installed in each of the first and second terminals 200A and 200B on the display unit 160 of the image display device in operation S203. The control unit 150 divides an application display area and displays the icons of applications installed in the first terminal 200A and the second terminal 200B on the divided application display areas for each terminal.

Then, the control unit 150 confirms whether an application installed in the first terminal 200A is identical to that in the second terminal 200B through comparison in operation S205.

Then, the control unit 150 displays a comparison screen in operation S207. The comparison screen may mean a first application display area where the icon of an application installed in the second terminal 200B but not installed in the first terminal 200A is displayed. The comparison screen may mean a second application display area where the icon of an application installed in the first terminal 200A but not installed in the second terminal 200B is displayed. The control unit 150 may display both the first application display area and the second application area, or may display only one screen. The control unit 150 may display both the first application display area and the second application area through an additional pop-up window.

The comparison screen may mean a screen where, if it is confirmed that there is an identical application by comparing applications installed in the first terminal 200A and the second terminal 200B, only the icon of the most recently updated application is displayed.

Then, the control unit 150 selects one of the icons of the applications displayed on the comparison screen through the user input unit 120 or a remote control device in operation S209.

Then, the control unit 150 installs the selected application in the first terminal 200A in operation S211.

The method of selecting the icon of the application may vary. For example, the control unit 150 displays a selection list for installation in the first application display area, so that applications not installed in the first terminal 200A may be selected at once. In this case, the control unit 150 installs all applications in the first terminal 200A, which are not installed in the first terminal 200A but installed in the second terminal 200B.

When a user wants to select a specific application, if the icon of a corresponding application displayed on the display unit 160 is touched by the user for more than 1 sec, it is regarded that the icon is selected. Moreover, after the icon touch time of more than 1 sec elapses, when a drag and drop operation is performed on the application division area of the first terminal 200A, the corresponding application may be installed in the first terminal 200A.

When it is confirmed that all applications installed in the first and second terminals 200A and 200B are identical through comparison, the control unit 150 displays the icons of the applications, which are installed in the first and second terminals 200A and 200B, on the divided areas of the display unit for each terminal.

FIG. 7 is a view illustrating processes that while an image display device 100 is connected to a first terminal 200A and a second terminal 200B, after applications installed in the first terminal 200A and the second terminal 200B are compared, the icon of an application not installed in each terminal is displayed.

Referring to FIG. 7, the first terminal 200A and the second terminal 200B are connected to the image display device 100. When a predetermined time elapses after connection, the icons of applications installed in the first terminal 200A but not installed in the second terminal 200B are displayed of the first application display area 161 of the display unit 160, and the icons of applications installed in the second terminal 200B but not installed in the first terminal 200A are displayed of the second application display area 162 of the display unit 160 According to an embodiment, only one screen of the first application display area 163 and the second application display area 164 may be displayed by a user's setting.

Figure 8:
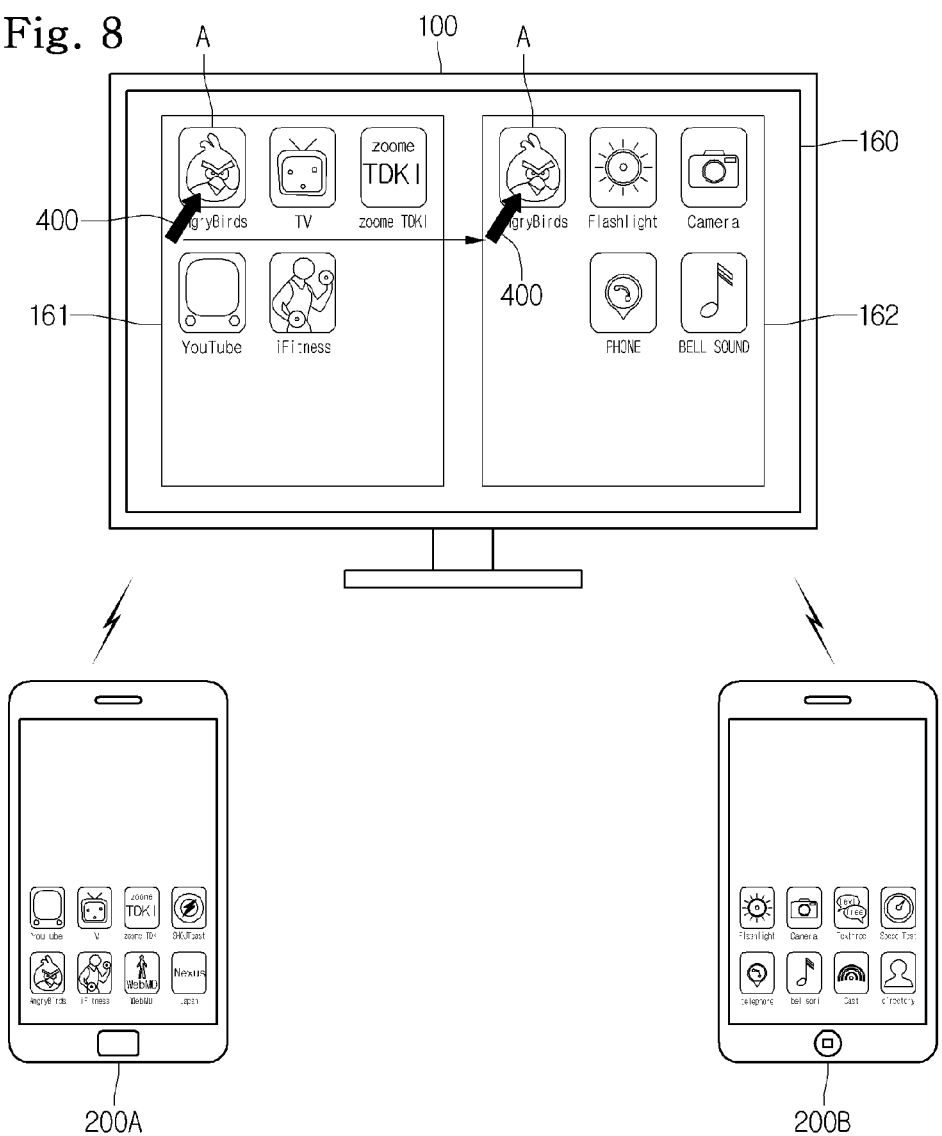
FIG. 8 is a view illustrating processes that an application not installed in the second terminal is installed according to an embodiment of the present invention.

FIG. 8 is a view illustrating processes that an application not installed in the second terminal 200B is installed according to an embodiment of the present invention.

Referring to FIG. 8, when an application A displayed of the first application display area 161 is to be installed in the second terminal 200B, a pointer 400 using a remote control device may be used. After the icon of the application A in the first application area 162 is selected through the pointer 400, as the icon is moved to the second application display area 164, the application A is installed in the second terminal 200B.

According to another embodiment, when a user terminal and an opponent terminal are connected to an image display device, a user may easily install an application installed in the opponent terminal but not installed in the user terminal through the above processes, without accessing an additional contents providing server. Therefore, the user's convenience may be improved.

Then, after an application installed in a terminal connected to an image display device is executed, the executed application is downloaded for execution when the terminal is disconnected from the image display device. These processes will be described below.

Figure 9:
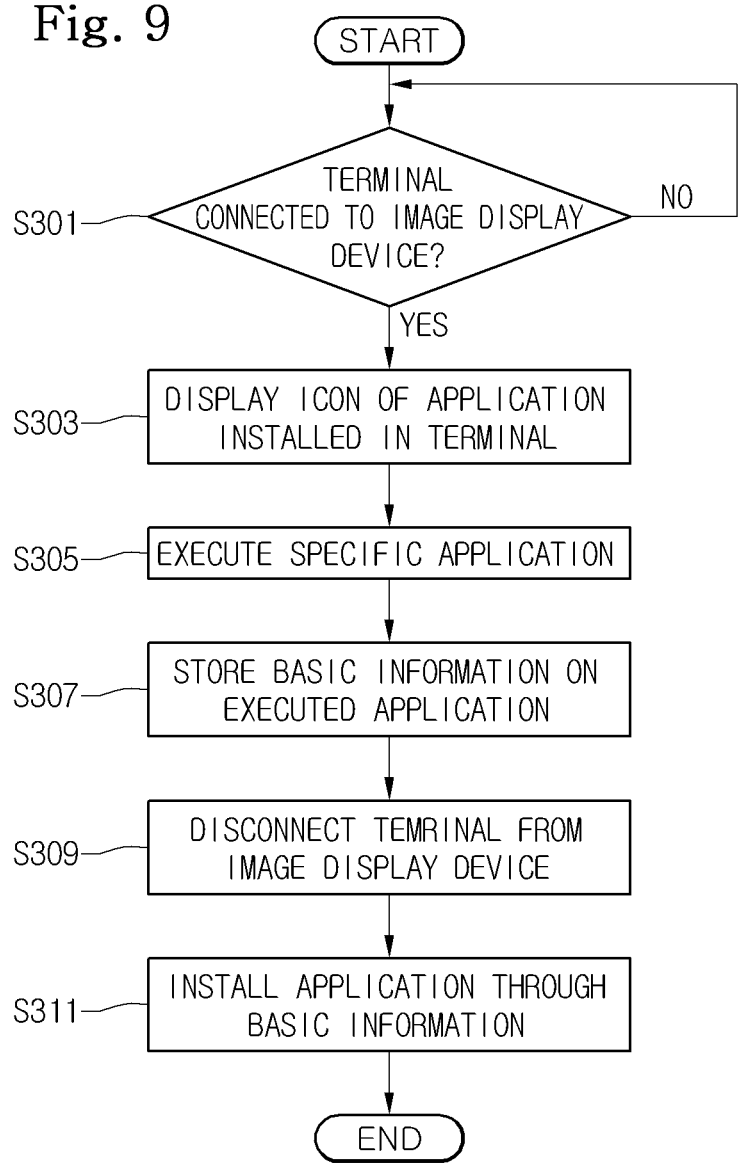
FIG. 9 is a flowchart illustrating a method of controlling an image display device according to another embodiment of the present invention.

FIG. 9 is a flowchart illustrating a method of controlling an image display device according to another embodiment of the present invention.

First, the control unit 150 confirms whether the terminal is connected to the image display device in operation S301.

Then, when it is confirmed that the terminal is connected to the image display device, the control unit 150 displays the icon of an application installed in the terminal on the display unit 160 in operation S303.

Then, the control unit 150 may receive a command for selecting one of the applications displayed on the display unit 160 through the user input unit 120 or a remote control device, and then, may execute the corresponding application in operation S305.

After that, the control unit 150 stores basic information on the executed application in the storage unit 140 of the image display device in operation S307. The basis information on the application may means information on the icon of an application, information of an application execution date and time, and information on the version of an application, but is not limited thereto. The control unit 150 may store the basic information on the executed application in a database of a service discovery protocol (SDP) not in the storage unit 140 of the image display device.

Then, the control unit 150 may confirm that the terminal is disconnected from the image display device in operation S309.

After that, the control unit 150 installs a corresponding application of the image display device by using the stored basic information in operation S311. According to an embodiment, when another terminal is connected to the image display device, the control unit 150 may install a corresponding application in the other terminal through an installation command of a user.

Figure 10:
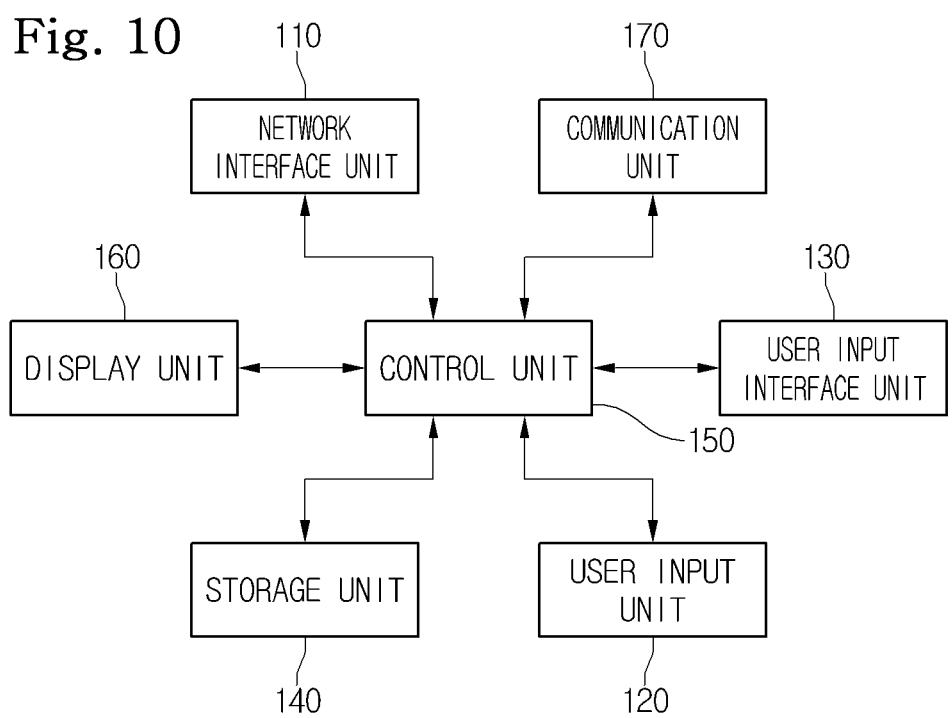
FIG. 10 is a block diagram illustrating an image display device according to another embodiment of the present invention.

FIG. 10 is a block diagram illustrating an image display device according to another embodiment of the present invention.

Referring to FIG. 10, the image display device 100 may include a network interface unit 110, a user input unit 120, a user input interface unit 130, a storage unit 140, a control unit 150, a display unit 160, and a communication unit 170.

The network interface unit 110 may receive a packet from a network, and may transmit a packet to a network. That is, the network interface unit 110 may receive service and contents from a service provider or an application providing server via a network. The contents may include audio files, video files, and applications, but are not limited thereto.

The user input unit 120 may include a keypad, a button, a touch pad, or a touch screen. A user may manipulate the user input unit 120, and then may input a command relating to application execution. When the user input unit 120 includes a hard key button, a user may input a command relating to application execution through a push operation of the hard key button.

When the user input unit 120 includes a touch screen, a user may input a command relating to application execution by touching a soft key of the touch screen. Additionally, the user input unit 120 may include various kinds of input means that a user can manipulate such as a scroll key or a jog key.

Through the user input interface unit 130, a user may deliver an inputted signal to the control unit 150, or may deliver a signal from the control unit 150 to a user. For example, the user input interface unit 130 may receive a control signal such as power on/off, channel selection, and screen setting from a remote control device and may process the received signal according to various communication methods such as a radio frequency (RF) communication method or an infrared (IR) communication method, or may process and transmit a control signal from the control unit 150 to the remote control device.

The remote control device transmits a user input relating to application execution to the user input interface unit 130. For this, the remote control device may use a Bluetooth, RF communication, Ultra Wideband (UWB), or ZigBee type.

Moreover, the user input interface unit 130 may deliver to the control unit 150 a control signal inputted through the user input unit 120 including a local key such as a power key, a channel key, a volume key, and a setting value.

The user input interface unit 130 may deliver a control signal, inputted from a sensing unit (not shown) for sensing a user's gesture, to the control unit 150, or may transmit a signal from the control unit 150 to a sensing unit (not shown). Moreover, the sensing unit (not shown) may include a touch sensor, a voice sensor, a position sensor, and a motion sensor.

The storage unit 140 may store programs for processing and controlling each signal in the control unit 150, and also may store signal-processed image, voice, data signals.

The storage unit 140 may perform a function for temporarily storing image, voice, or data signals inputted from the network interface unit 110, and also may store information on a predetermined image through a channel memory function.

Especially, the storage unit 140 may store terminal information that the image display device 100 receives. The terminal information may include terminal basic information and information on the application installed in the terminal, and this will be described later.

The storage unit 140 may include at least one type of storage medium among a flash memory type, a hard disk type, a multimedia card micro type, a card type memory (for example, SD or XD memory), a RAM type, and a ROM type such as EEPROM.

The display unit 160 may convert an image signal, data signal, and OSD signal processed in the control unit 150 and an image signal and data signal received from an external device, into R, G, and B signals in order to generate a driving signal.

The display unit 160 may display information on a terminal connected to the image display device 100.

When the image display device 100 is connected to a plurality of terminals, the display unit 160 may display information on applications, which are received from the plurality of terminals, on the divided areas of the display unit 160 for each terminal. This will be described later.

The display unit 160 may include a PDP, an LCD, an OLED, a flexible display, and a 3D display, or may include a touch screen in order to use it as an input device in addition to an output device.

The image display device 100 may play contents files stored in the storage unit 140 (such as movie files, still image files, music files, document files, and application files) and then may provide them to a user.

The communication unit 170 transmits a request message to an external in order for network connection with the image display device 100, and receives a response message corresponding to the request message.

The communication unit 170 may receive information on a terminal connected to the image display device 100. A specific operation of the communication unit 170 will be described later.

The control unit 150 may control general operations of the image display device 100.

Additionally, the control unit 150 may control the image display device 100 according to a user command inputted through the user input interface unit 130 or an internal program, and may access a network to download application or an application list that a user wants in the image display device 100.

Moreover, the control unit 150 may control the display unit 160 in order to display an image, and for example, may control a broadcast image inputted through a tuner, an external input image inputted through an external device, an image inputted through the network interface unit 110, or an image stored in the storage unit 140 to be displayed on the display unit 160. In this case, an image displayed on the display unit 160 may be a still image, a video, a 2D image, or a 3D image.

Additionally, the control unit 150 may control contents stored in the image display device 100, received broadcast contents, or external input contents inputted through an external to be played. The contents may be in various formats such as a broadcast image, an external input image, an audio file, a still image, an accessed web screen, and a document file.

A specific operation of the control unit 150 will be described later.

Next, referring to FIGS. 11 to 20, a method of controlling an image display device according to another embodiment of the present invention will be described.

Figure 11:
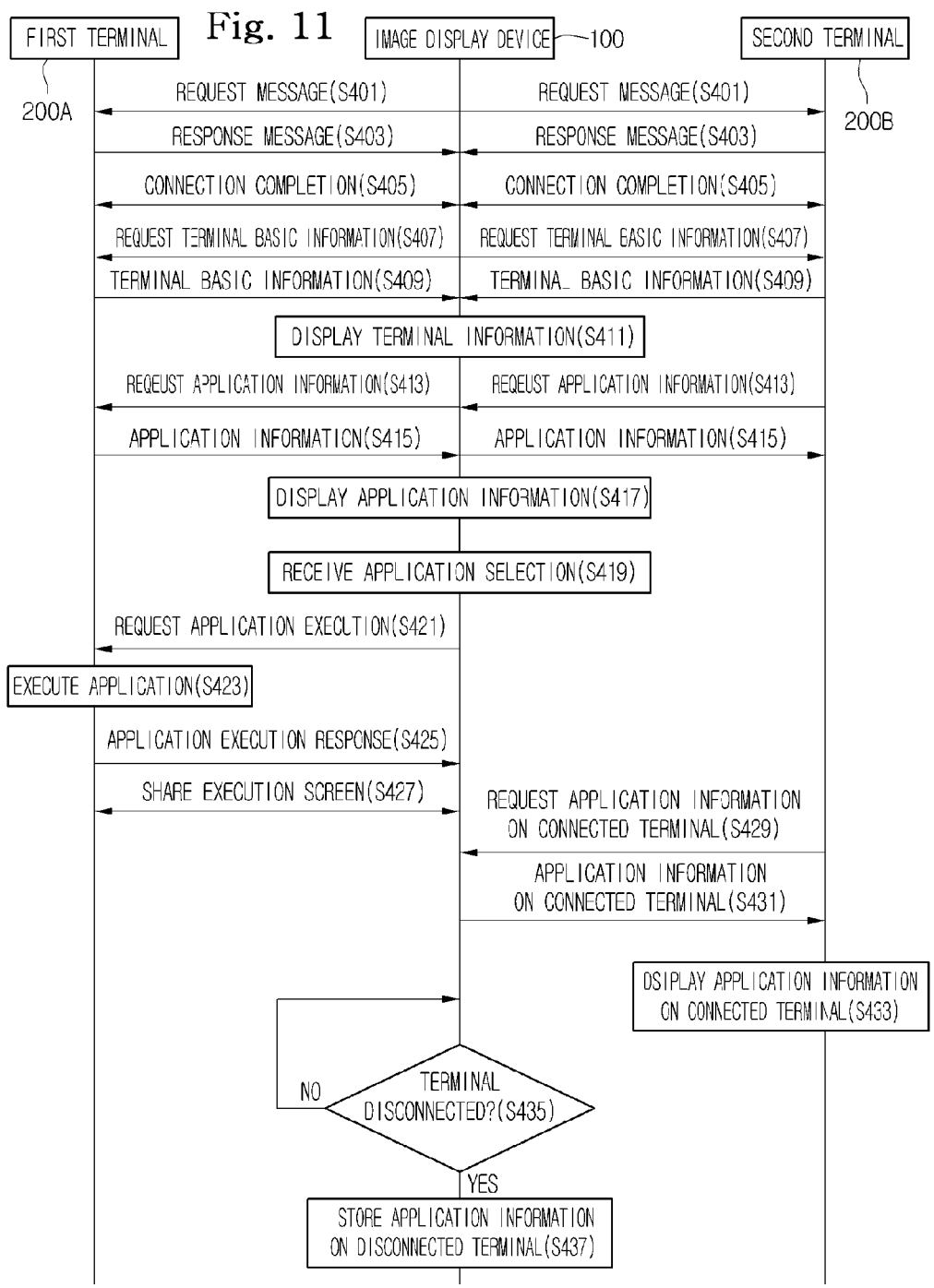
FIG. 11 is a ladder diagram illustrating a method of controlling an image display device according to another embodiment of the present invention.

FIG. 11 is a ladder diagram illustrating a method of controlling an image display device according to another embodiment of the present invention.

First, the communication unit 170 of the image display device 100 transmits a request message for network connection with the image display device 100 to an external in operation S401. According to an embodiment, the communication unit 170 may transmit the request message to the terminal 200 around the image display device 100 through a broadcast method. The broadcast method means a communication method for transmitting the same information or message from one place to a plurality of places.

According to an embodiment, a request message may be a message for requesting an identifier, which indicates that a technique for transmitting a communication protocol address (for example, an IP address) for communication between the image display device 100 and the terminal 200, a port, and application information on the terminal 200 described later to the image display device 100 is available.

The communication unit 170 of the image display device 100 receives a response message corresponding to the request message from the terminal 200 in operation S403. According to an embodiment, a response message may include a communication protocol address, port, and identifier corresponding to the request message. The image display device 100 completes connection with the terminal 200 through socket communication by using the communication protocol address, the port, and the identifier in operation S405. According to embodiment of the present invention, the socket communication, as a kind of bidirectional communication method for exchanging information between devices, may use a reliability communication method (for example, TCP) or an unreliable communication method (for example, UDP).

Also, the terminal 200 may transmit a request message for network connection with the image display device 100, and may transmit a response message according thereto to the terminal 200, so that connection between each other may be completed using socket communication.

The control unit 150 of the image display device 100 requests terminal basic information to the terminal 200 connected to the image display device 100. According to an embodiment, the basic information on the terminal 200 may include the model of the terminal 200 and information on an operating system that the terminal 200 uses, but is not necessarily limited thereto.

The communication unit 170 of the image display device 100 receives the basic information on the terminal 200 in response to the basic information request of the terminal 200 in operation S409.

The display unit 160 of the image display device 100 displays the received basic information on the terminal 200 in operation S411. According to an embodiment, the display unit 160 may display the received basic information on the terminal 200 as a list. In more detail, this will be described with reference to FIG. 12.

Figure 12:
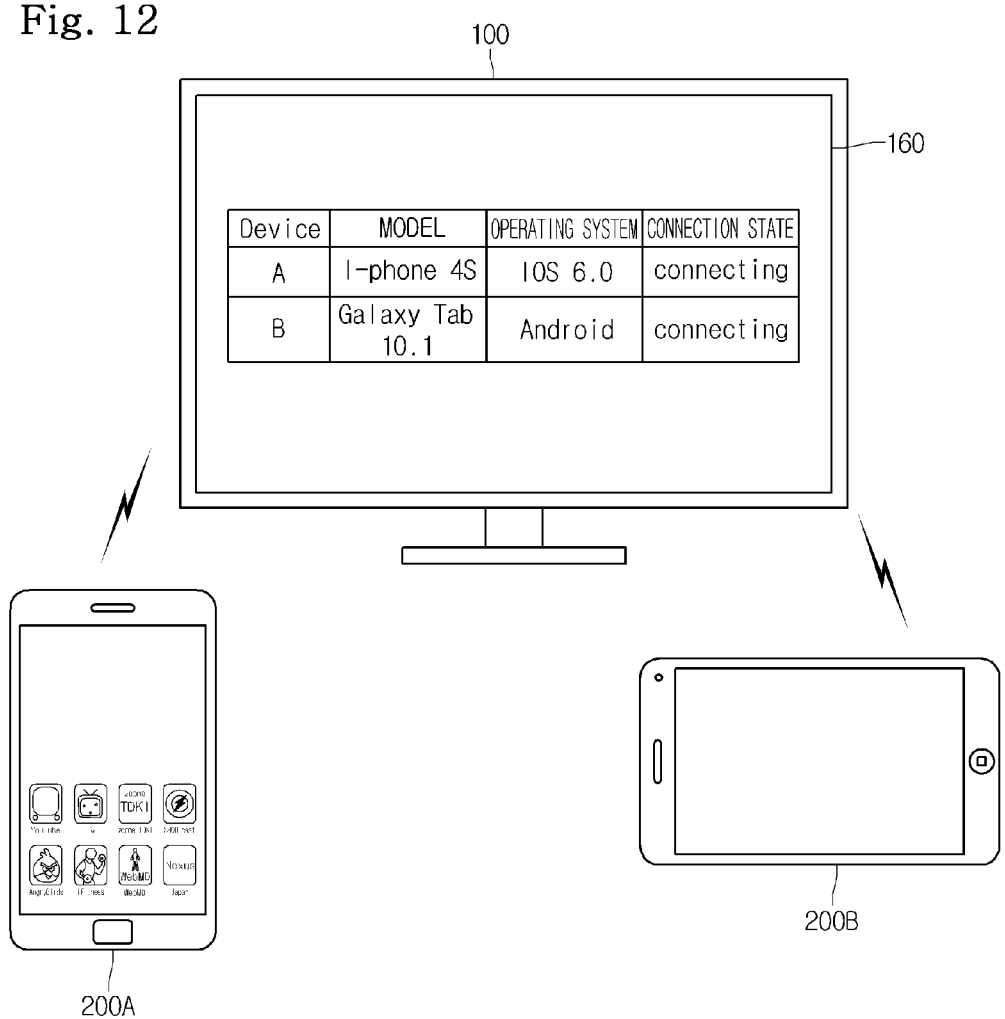
FIG. 12 is a view when basic information on a terminal connected to an image display device is displayed according to an embodiment of the present invention.

FIG. 12 is a view when basic information on a terminal connected to an image display device is displayed according to an embodiment of the present invention.

According to the embodiment of FIG. 12, a first terminal 200A and a second terminal 200B connected to an image display device 100 are shown. Of course, although the image display device 100 connected two terminals 200A and 200B is shown in FIG. 12, the present invention is not limited thereto. That is, more than two terminals may be connected to the image display device 100.

As shown in FIG. 12, the display unit 160 of the image display device 100 may display basic information on the connection completed first terminal 200A and second terminal 200B. That is, the display unit 160 may display the model of each of the terminals 200A and 200B and the operating system that each of the terminals 200A and 200B uses, as a list. According to an embodiment, the list that the display unit 160 displays may further include a connection state of each of the terminals 200A and 200B.

Referring to FIG. 11 again, the control unit 150 of the image display device 100 requests application information to the terminal 200 connected to the image display device 100 in operation S413. According to an embodiment, the application information, as information on applications installed in each terminal 200, may include the number of applications installed in each terminal 200, the identifier of an application, the name of an application, the package name of an application, the class name of an application, the application version, and the icon of an application.

The communication unit 170 of the image display device 100 receives application information from each terminal 200 in response to the application information request in operation S415. According to an embodiment, the image display device 100 may receive the icon of an application among the application information on the terminal 200 in a Portable Network Graphics (PNG) format, but is not limited thereto.

According to an embodiment, the image display unit 100 may receive the application information of each terminal 200 in eXtensible Language (XML). In more detail, the image display device 100 may receive information in XML such as the number of applications, an application identifier, an application name, an application package name, an application class name, and an application version among the application information of each terminal 200, but is not limited thereto. XML for the application information will be described with reference to FIG. 13.

Figure 13:
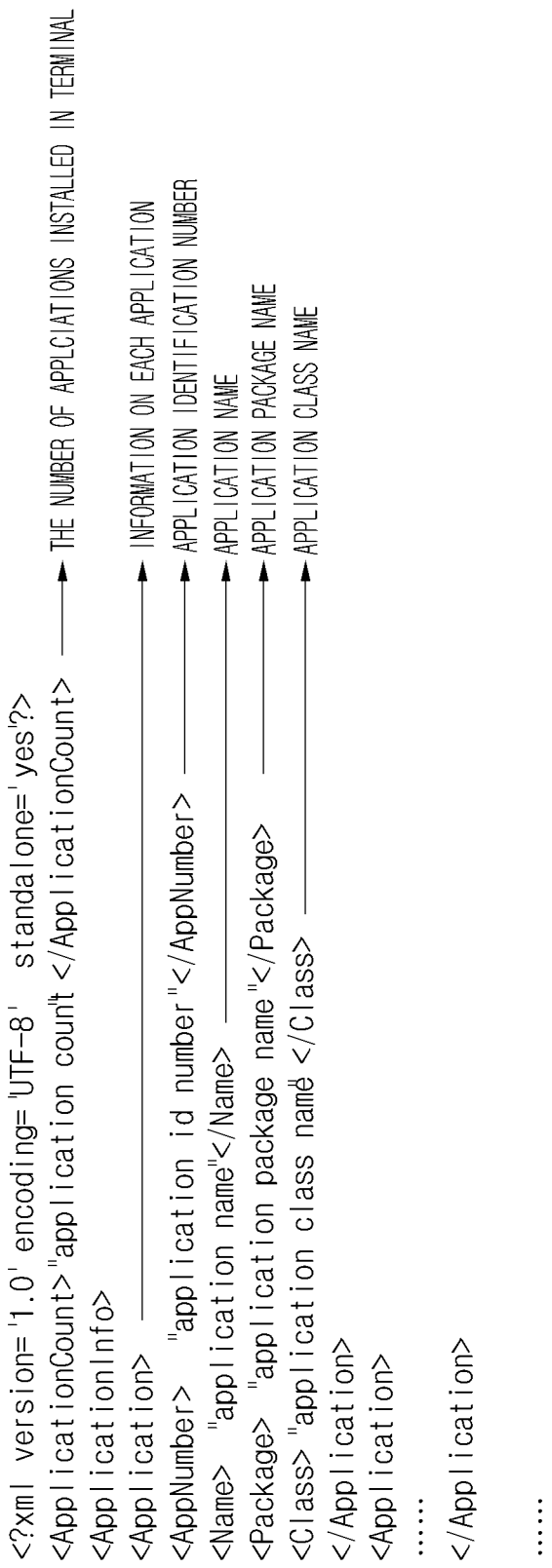
FIG. 13 is a view illustrating application information in an XML format, which is received from a terminal to an image display device according to an embodiment of the present invention.

FIG. 13 is a view illustrating application information in an XML format, which is received from a terminal to an image display device according to an embodiment of the present invention.

<ApplicationCount> is an item indicating the number of applications installed in a terminal.

<ApplicationInfo> is an item indicating detail information on each application.

<AppNumber> is an item indicating the identification number of an application.

<Name> is an item indicating the name of an application.

<Package> is an item indicating the name of an application package.

<Class> is an item indicating the name of an application class.

When FIG. 11 is described again, the image display device 100 may receive information on all applications installed in each terminal 200 and may receive information on some applications installed in each terminal 200. That is, the terminal 200 may transmit only some application information to the image display device 100 in response to the application information request of the image display device 100.

A user may set application information to be transmitted to the image display device 100 and application information not to be transmitted through the terminal 200. In more detail, a user may select application information through lock setting, which is not to be transmitted when the image display device 100 is connected.

Later, in response to the application information request of the image display device 100, the terminal 200 may transmit only some application information allowed for transmission according to a user's setting.

The display unit 160 of the image display device 100 displays the received application information from each terminal 200 in operation S417. According to an embodiment, the display unit 160 may display the application information on the terminal 200 through various methods. This will be described with reference to FIGS. 14 to 17.

Figure 14:
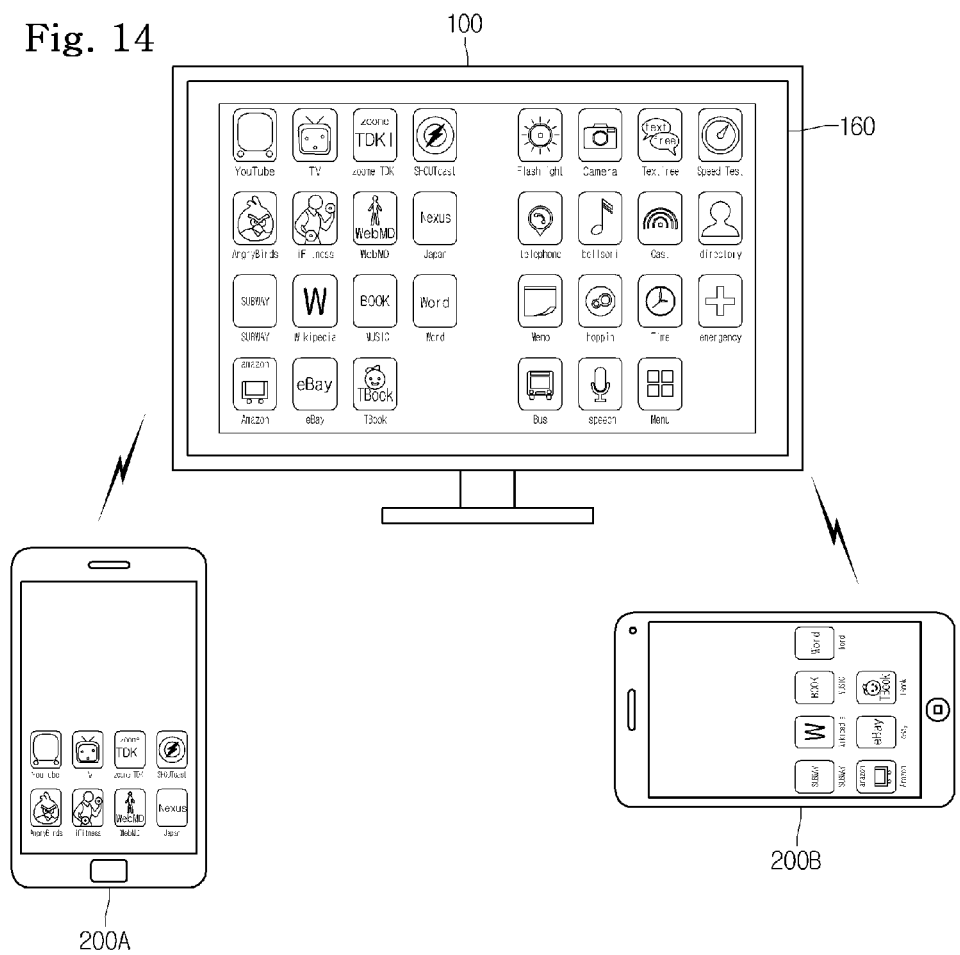
FIG. 14 is a view when a display unit displays the received application information from a first terminal and second terminal connected to an image display device without distinction of the terminals according to an embodiment of the present invention.

FIG. 14 is a view when a display unit 160 displays the received application information from a first terminal 200A and second terminal 200B connected to an image display device 100 without distinction of the terminals 200A and 200B according to an embodiment of the present invention.

Especially, the display unit 160 may display the icon of an application and its name at the bottom of the icon among the application information received from the first terminal 200A and the second terminal 200B, without distinction of the terminals 200A and 200B.

Figure 15:
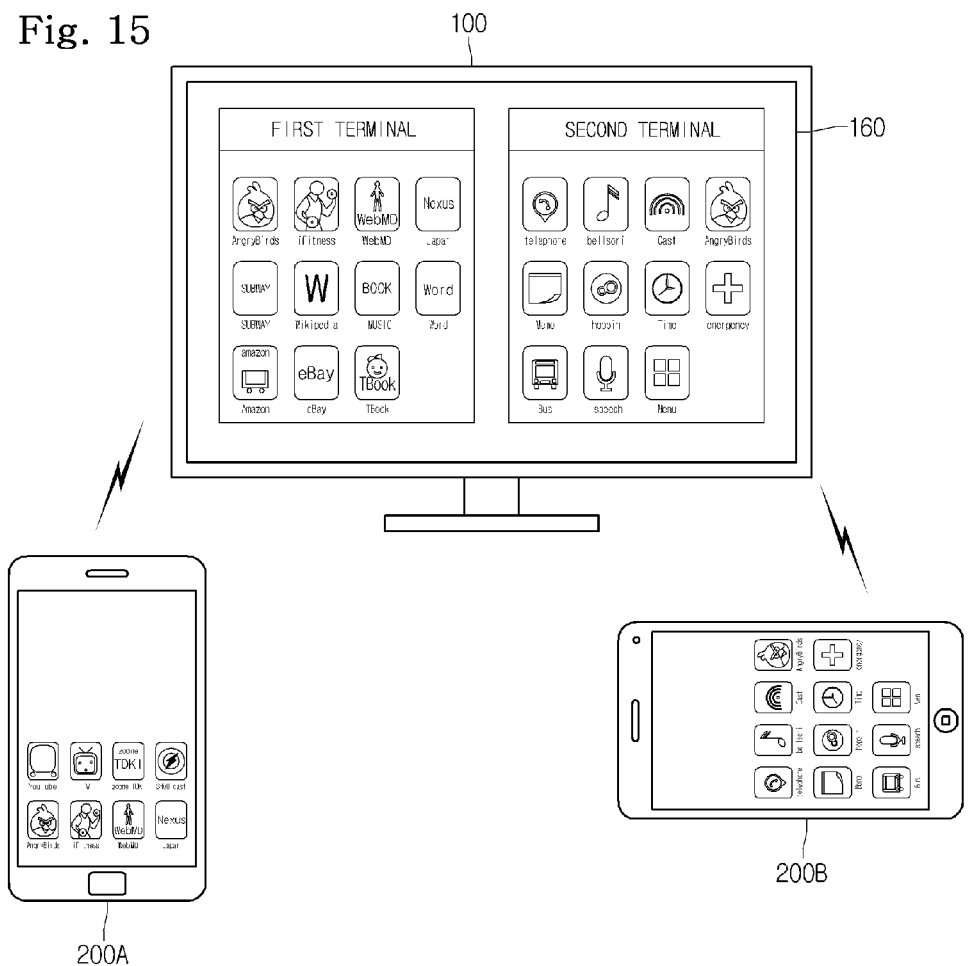
FIG. 15 is a view when a display unit displays the received application information from a first terminal and second terminal connected to an image display device with distinction of the terminals according to an embodiment of the present invention.

Unlike this, as shown in FIG. 15, the display unit 160 displays the received application information from a first terminal 200A and second terminal 200B connected to the image display device 100 by each terminal.

That is, referring to FIG. 15, the display unit 160 of the image display device 100 may separately display information (for example, an icon and a name) of an application received from the first terminal 200A and information (for example, an icon and a name) of an application received from the second terminal 200B by each terminal.

According to an embodiment, the display unit 160 may further display information in addition to the icon of an application and the name of an application. This will be described with reference to FIG. 16.

Figure 16:
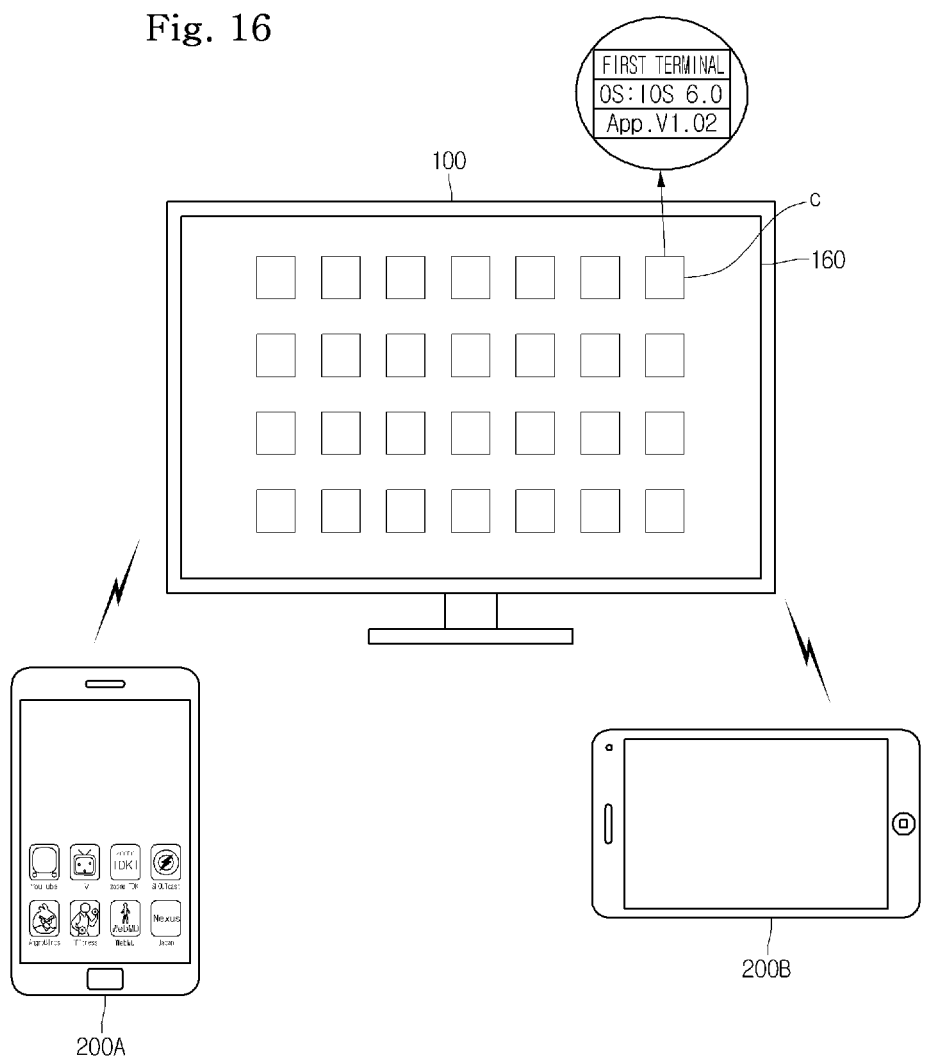
FIG. 16 is a view when a display unit of an image display device displays additional information other than the icon of an application and the name of an application according to an embodiment of the present invention.

FIG. 16 is a view when the display unit 160 displays additional information other than the icon of an application and the name of an application. Referring to FIG. 16, the additional information may be displayed on the icon C of a specific application. Here, the additional information may include a terminal having a corresponding application installed, an operating system that the terminal uses, and an application version.

The embodiment shown in FIG. 16 assumes and describes the case that application information received from the first terminal 200A and the second terminal 200B is displayed without distinction of terminals, but may be applicable to the case application information is displayed by each terminal as shown in FIG. 15.

According to an embodiment, unlike FIG. 16, when the pointer 400 is positioned on the icon of a specific application, additional information on the application may be displayed through an additional application information window. This will be described with reference to FIG. 17.

Figure 17:
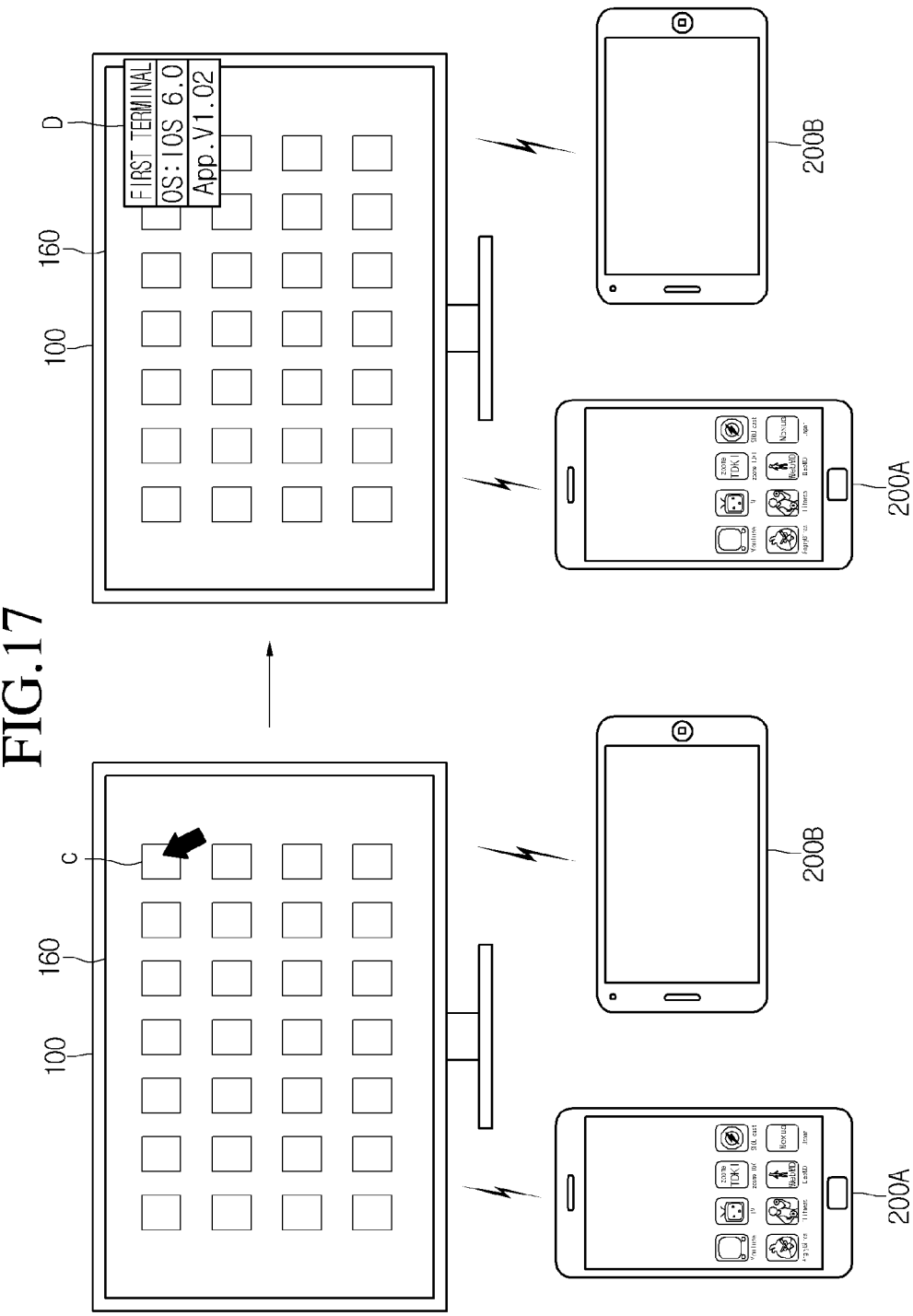
FIG. 17 is a view that when a pointer is positioned on the icon of a specific application, additional information on a corresponding application is displayed through an application information window according to an embodiment of the present invention.

FIG. 17 is a view that when a pointer 400 is positioned on the icon of a specific application, additional information on a corresponding application is displayed through an application information window.

Referring to FIG. 17, when the pointer 400 is positioned on the application icon C on the display unit 160, it is confirmed that an application information window D is displayed. A user may move the pointer 400 by using a remote control device, and may position the pointer 400 on the application icon C. When the pointer 400 is positioned on the application icon C, it is confirmed that the application information window D is displayed. Thus, a user may confirm application information through the application information window D.

According to an embodiment, when a user clicks the application icon C once through the pointer 400, the application information window D may be displayed.

The embodiment shown in FIG. 17 assumes and describes the case that application information received from the first terminal 200A and the second terminal 200B is displayed without distinction of terminals, but may be applicable to the case application information is displayed by each terminal as shown in FIG. 15.

According to an embodiment, the control unit 150 of the image display device 100 may confirm whether there is an identical application by comparing application information received from the first terminal 200A and the second terminal 200B, and the display unit 160 groups the same application information and then displays it. This will be described with reference to FIG. 18.

Figure 18:
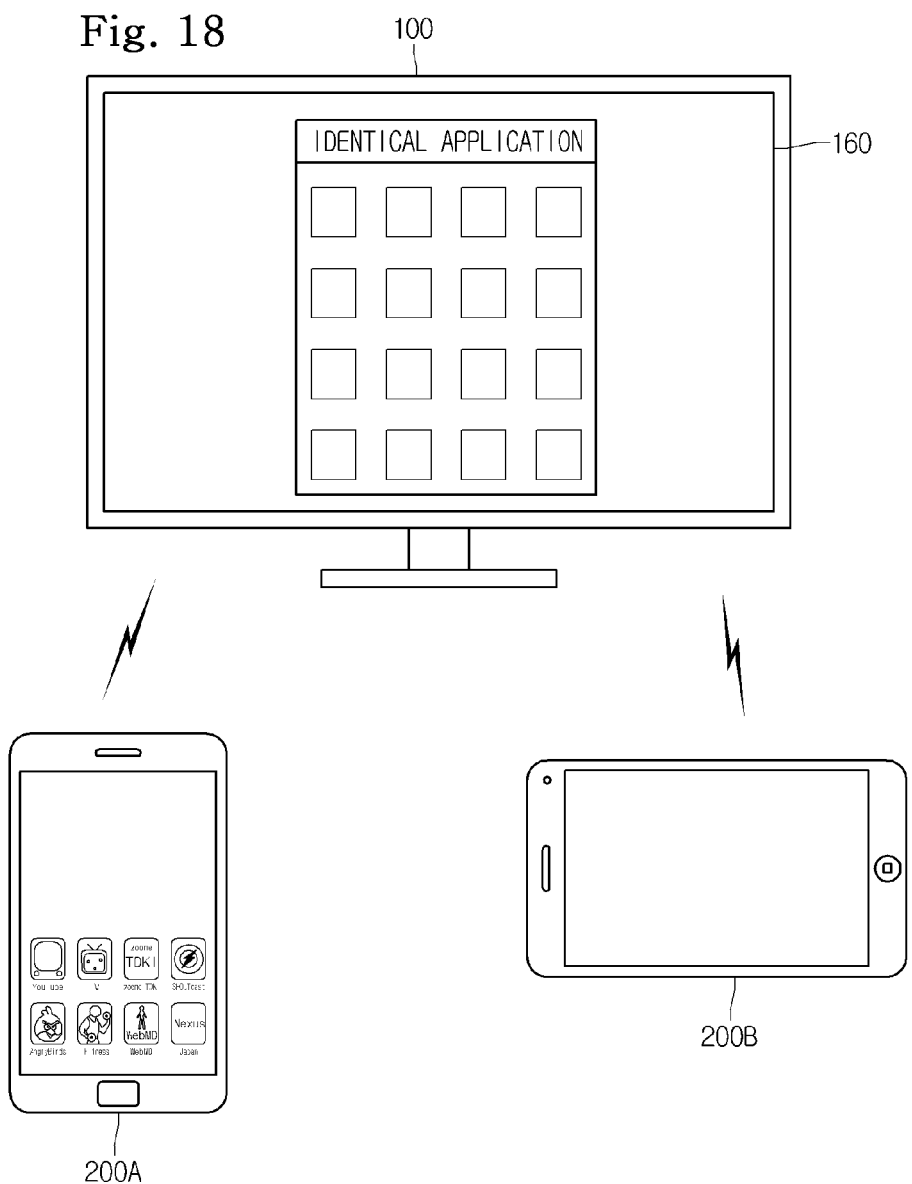
FIG. 18 is a view when a display unit of an image display device displays identical application information among the received application information from a first terminal and a second terminal according to an embodiment of the present invention.

FIG. 18 is a view when a display unit 160 displays identical application information among application information received from a first terminal 200A and a second terminal 200B according to an embodiment of the present invention.

Referring to FIG. 18, the display unit 160 displays information on the identical application among the application information received from the first terminal 200A and the second terminal 200B. A user may recognize an identical application at a glance among applications that the terminal 200 connected to the image display device 100 has.

Additionally, the embodiment of FIG. 16 in which additional information of an application is displayed on the application icon and the embodiment of FIG. 17 in which the pointer 400 is positioned and an application information window is generated by clink may be applicable to the embodiment of FIG. 18.

According to an embodiment, the control unit 150 of the image display device 100 may confirm whether there is an identical application by comparing application information received from the first terminal 200A and the second terminal 200B. The display unit 160 may display information on identical applications and information on different applications. This will be described with reference to FIG. 19.

Figure 19:
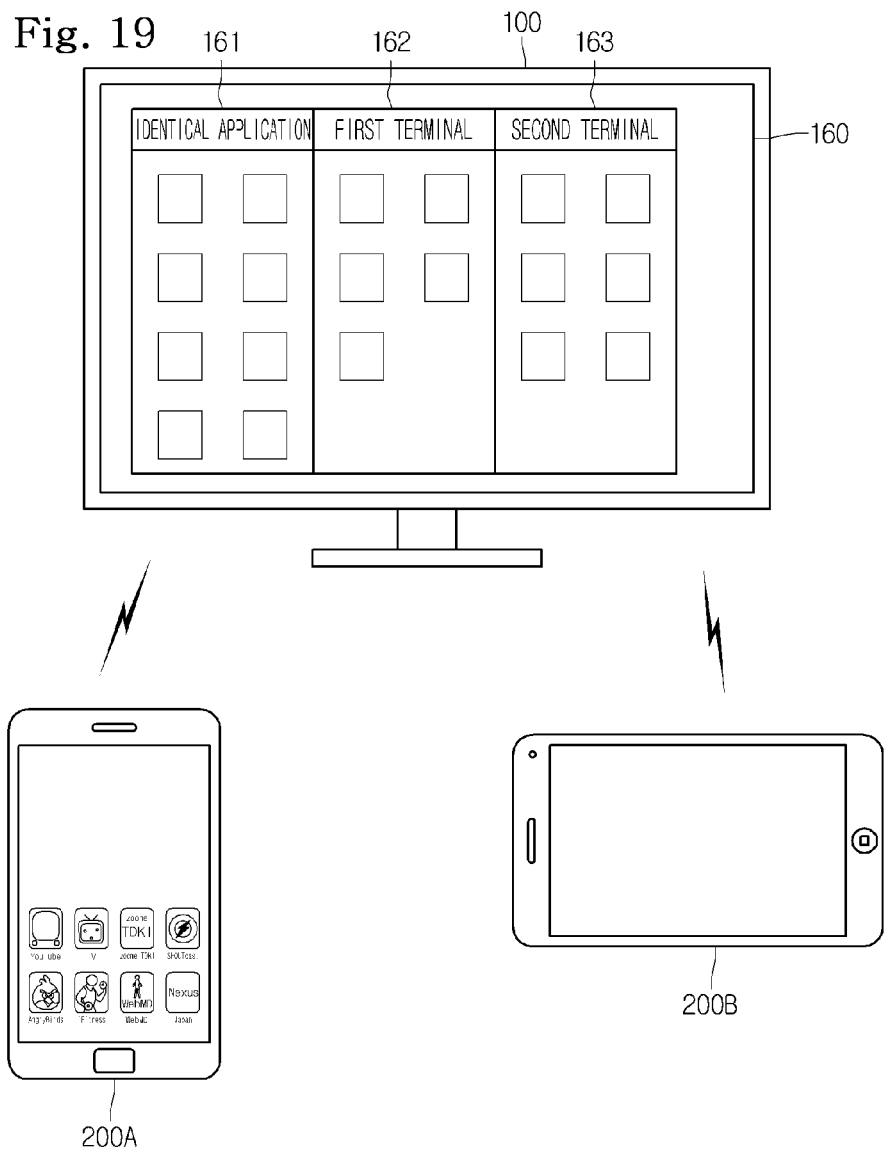
FIG. 19 is a view when identical application information and different application information among the received application information from a first terminal and a second terminal according to an embodiment of the present invention.

FIG. 19 is a view when identical application information and different application information among application information received from a first terminal 200A and a second terminal 200B are displayed according to an embodiment of the present invention.

Referring to FIG. 19, the display unit 160 includes a first application display area 161, a second application display area 162, and a third application display area 163.

The first application area 161 of the display unit 160 displays identical application information among application information received from the first terminal 200A and the second terminal 200B. The second application display area 162 displays the application information not received from the second terminal 200B and received from only the first terminal 200A among the received application information, and the third application display area 163 displays the application information not received from the first terminal 200A and received from the second terminal 200B among the received application information.

A user may recognize identical applications and different applications at a glance among the applications installed in the terminal 200.

Additionally, the embodiment of FIG. 16 in which additional information of an application is displayed on the application icon and the embodiment of FIG. 17 in which the pointer 400 is positioned and an application information window is generated by clink may be applicable to the embodiment of FIG. 19.

Referring to FIG. 11 again, the user input interface unit 130 of the image display device 100 receives an application selection command inputted by a user in operation S419. The application selection command may be received by an input of a user who double-clicks a specific application icon through the pointer 400 of FIG. 14, but is not limited thereto.

The control unit 150 of the image display device 100 requests the execution of the application selected according to the reception of the application selection command in operation S421. According to an embodiment, when the application selected by a user is an application received only from the first terminal 200A, the control unit 150 of the image display device 100 may request the execution of the application to the first terminal 200A.

The first terminal 200A executes a corresponding application in response to the application execution request received from the image display device 100 in operation S423, and the image display device 100 receives a response for application execution request from the first terminal 200A in operation S425.

After that, according to the response for application execution request, the image display device 100 and the first terminal 200A share the execution screen of the selected application in operation S427. The sharing of the execution screen of the selected application may use various video sharing methods. As a specific example, one of Mobile High Definition Link (MHL), High-Definition Multimedia Interface (HDMI), and Wireless Display (WiDi) may be used.

The communication unit 170 of the image display device 100 receives an application information request from the second terminal 200B in operation S429. That is, the image display device 100 receives the application information request of the terminal 200 currently connected to the image display device 100, from the second terminal 200B.

The communication unit 170 of the image display device 100 transmits the application information received from the terminal 200 connected to the image display device 100, in response to the application information request of the second terminal 200B in operation S431.

The second terminal 200B displays the application information received from the image display device 100 in operation S433. This will be described with reference to FIG. 20.

Figure 20:
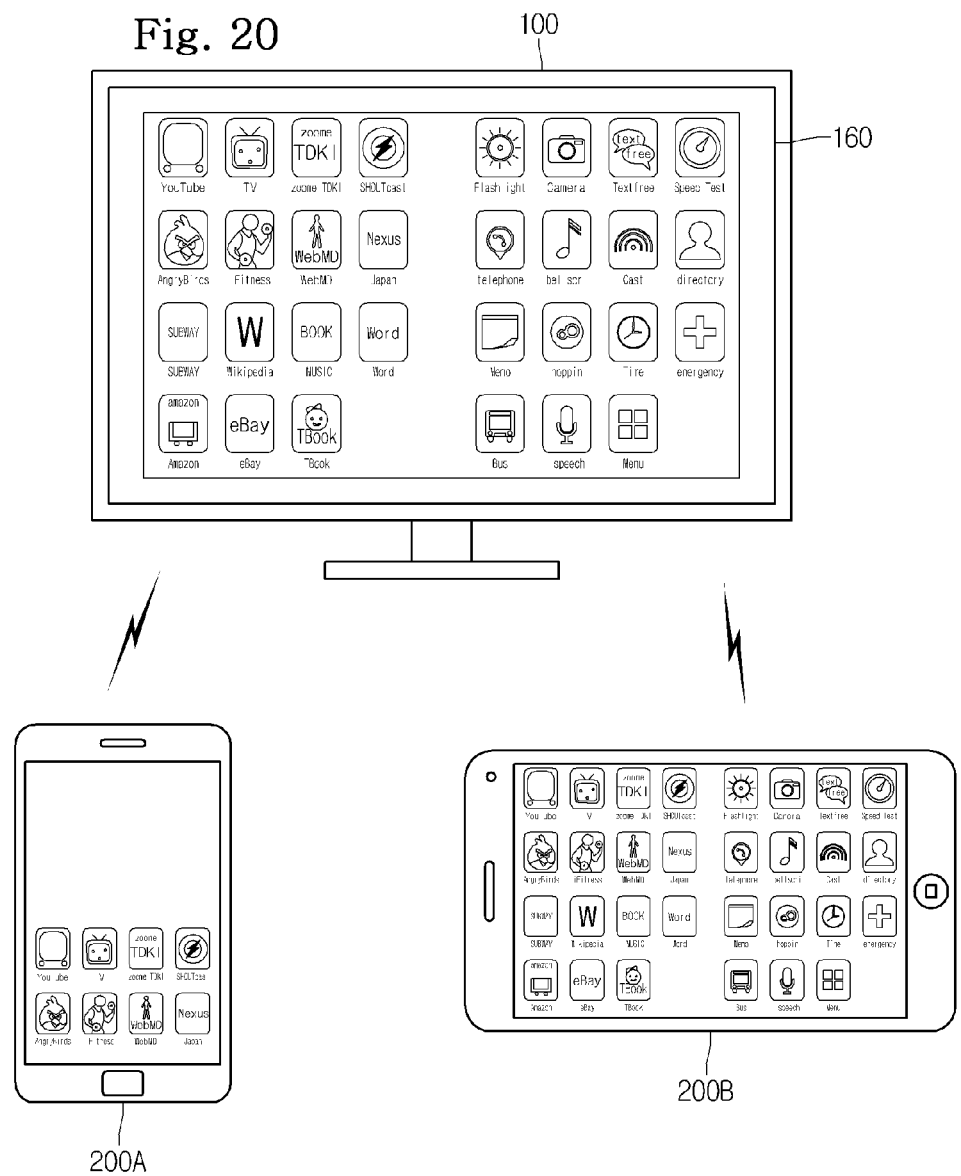
FIG. 20 is a view when a second terminal displays the received application information from an image display device according to an embodiment of the present invention.

FIG. 20 is a view when a second terminal 200B displays the received application information from an image display device 100.

Referring to FIG. 20, the second terminal 200B receives the application information that the image display device 100 has from the image display device 100, and displays the received application information. A user may confirm the application information on the terminal 200 connected to the image display device 100, through the second terminal 200B not the image display device 100. In this case, the second terminal 200B may be a movable portable terminal. A user may carry the second terminal 200B and move unless the second terminal 200B is disconnected from the image display device 100, so that the user may confirm application information on the terminal 200 connected to the image display device 100 in another place.

The control unit 150 of the image display device 100 confirms whether the terminal 200 is disconnected from the image display device 100 in operation S435. According to an embodiment, the control unit 150 transmits a connection signal to the terminal 200 periodically, in order to confirm that the terminal 200 is disconnected from the image display device 100. The case that the image display device 100 is disconnected from the terminal 200 may includes the case that the terminal 200 is turned off or the case that the terminal 200 becomes out of a communication available area of the image display device 100, but is not necessarily limited thereto.

If the image display device 100 is disconnected from the terminal 200, the storage unit 140 of the image display device 100 stores the application information received from the disconnected terminal 200 in operation S437. According to an embodiment, the storage unit 140 may store the application information of the disconnected terminal 200 and the basic information on the terminal 200.

According to another embodiment, before the image display device 100 is disconnected from the terminal 200, the storage unit 140 of the image display device 100 may store the application information on the terminal 200 in advance. Once disconnected, the control unit 150 of the image display device 100 may delete the application information of the disconnected terminal 200.

Next, referring to FIGS. 21 to 25, a method of controlling an image display device according to another embodiment of the present invention will be described.

Figure 21:
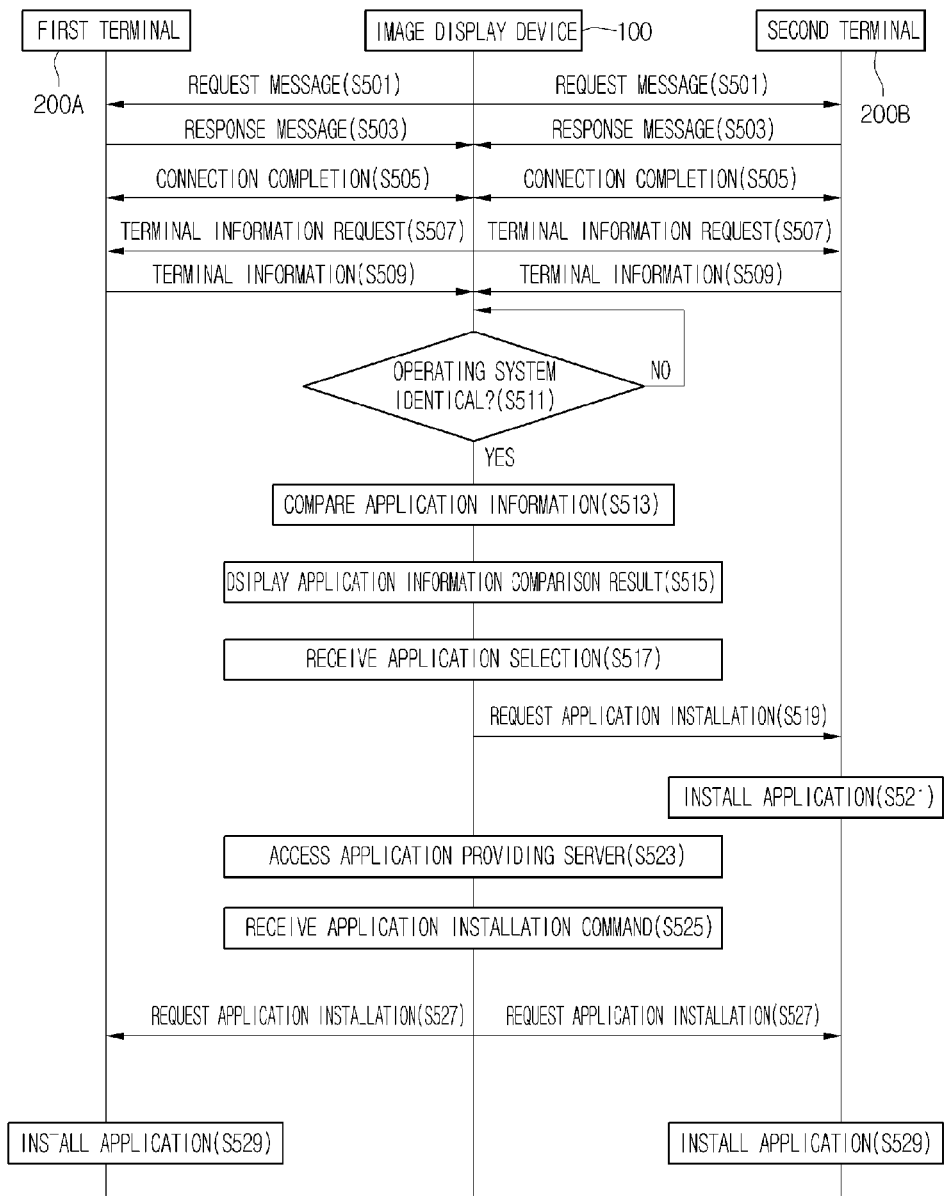
FIG. 21 is a ladder diagram illustrating a method of controlling an image display device according to another embodiment of the present invention.

FIG. 21 is a ladder diagram illustrating a method of controlling an image display device according to another embodiment of the present invention.

Since operations S501 to S505 are identical to operations S410 to S405 of FIG. 11, their detailed descriptions will be omitted.

The image display device 100 requests the information on the terminal 200 to the connected terminal 200 in operation S507. According to an embodiment, the information on the terminal 200 may include its basic information and its application information.

The basic information on the terminal 200 may include the model of the terminal 200 and information on an operating system that the terminal 200 uses, but is not necessarily limited thereto.

The application information on the terminal 200, as information on applications installed in the terminal 200, may include the number of applications installed in each terminal 200, the identifier of an application, the name of an application, the package name of an application, the class name of an application, the application version, and the icon of an application.

The image display device 100 receives the information on the terminal 200 from the connected terminal 200 in response to the information request of the terminal 200 in operation S509.

The control unit 150 of the image display device 100 may confirm whether the operating system of the first terminal 200A is identical to that of the second terminal 200B on the basis of the basic information received from the first terminal 200A and the second terminal 200B in operation S511.

If the operating system of the first terminal 200A is identical to that of the second terminal 200B, the control unit 150 of the image display device 100 may compare the received application information from the first terminal 200A with that from the second terminal 200B in operation S513. That is, the control unit 150 of the image display device 100 may confirm whether there are identical applications or different applications by comparing the application information received from the first terminal 200A and the second terminal 200B.

The display unit 160 of the image display device 100 displays the comparison result on the received application information from each terminal 200 in operation S515. The display unit 160 may display the comparison result of the application information through various methods. This will be described with reference to FIG. 22.

Figure 22:
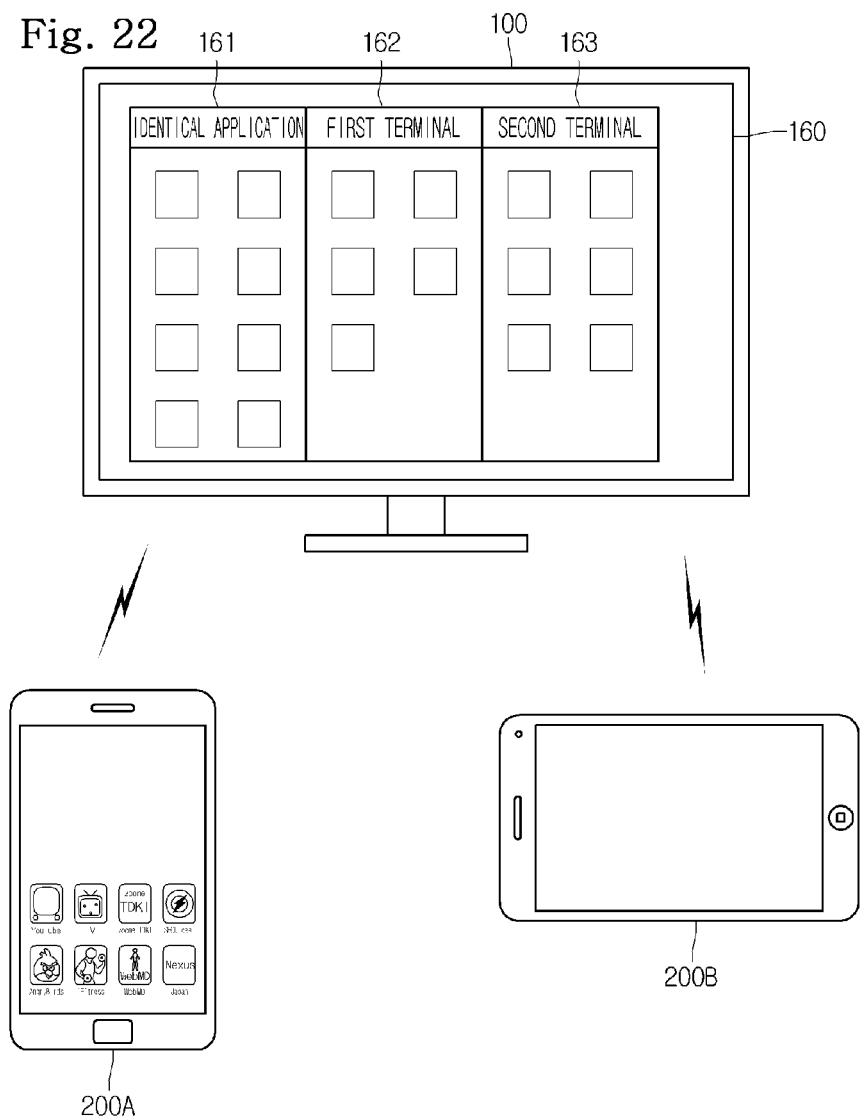
FIG. 22 is a view when the comparison result on the received application information from a terminal according to an embodiment of the present invention.

FIG. 22 is a view when the comparison result on the received application information from a terminal 200 according to an embodiment of the present invention.

Referring to FIG. 22, the display unit 160 includes a first application display area 161, a second application display area 162, and a third application display area 163.

The first application area 161 of the display unit 160 displays identical application information among application information received from the first terminal 200A and the second terminal 200B. The second application display area 162 displays the application information not received from the second terminal 200B and received from only the first terminal 200A among the received application information, and the third application display area 163 displays the application information not received from the first terminal 200A and received from the second terminal 200B among the received application information.

A user may recognize identical applications and different applications at a glance among the applications installed in the terminal 200.

Additionally, the embodiment of FIG. 16 in which additional information of an application is displayed on the application icon and the embodiment of FIG. 17 in which the pointer 400 is positioned and an application information window is generated by clink may be applicable to the embodiment of FIG. 22.

Referring to FIG. 21 again, the user input interface unit 130 of the image display device 100 receives an application selection command inputted by a user in operation S517. Here, the application selection command inputted by a user may be a command for selecting an application installed in the first terminal 200A but not installed in the second terminal 200B. According to an embodiment, the application selection command inputted by a user may be performed by clicking the pointer 400.

When the control unit 150 of the image display device 100 requests the installation of the selected application to the second terminal 200B according to the received application selection command in operation S519, the second terminal 200B installs the corresponding application in operation S521. According to an embodiment, the installation request and installation process of the selected application may be performed through the drag and drop operation of the pointer 400. This will be described with reference to FIG. 23.

Figure 23:
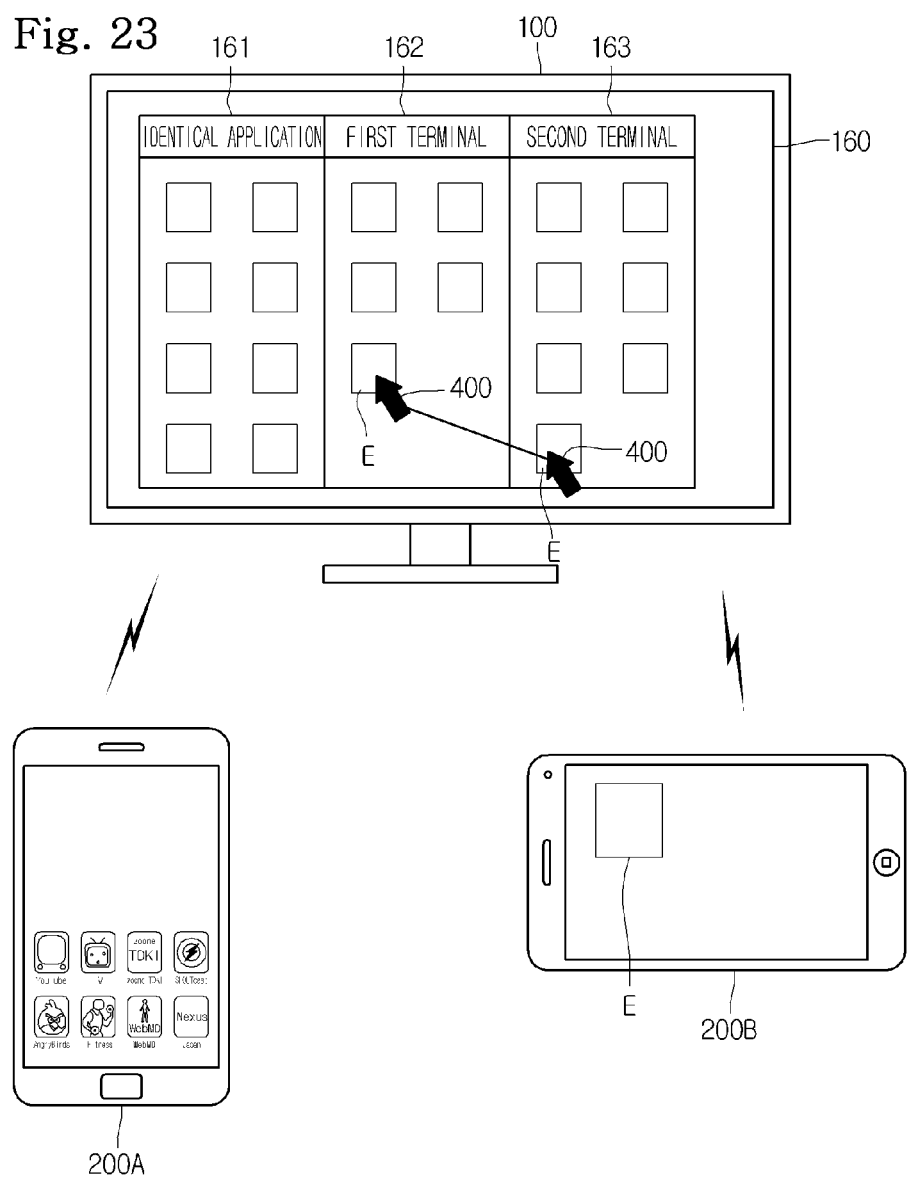
FIG. 23 is a view when an application is installed in a terminal according to an embodiment of the present invention.

FIG. 23 is a view when an application is installed in a terminal 200 according to an embodiment of the present invention.

Referring to FIG. 23, after a user selects an application icon E only in the first terminal 200A of the second application display area 162 through the pointer 400 and performs a drag and drop operation on the third application display area 163, an application corresponding to the application icon E may be installed in the second terminal 200B.

Referring to FIG. 21 again, the image display device 100 accesses an application providing server in operation S523. The accessing of the application providing server may be performed by a user's input.

The user input interface unit 130 of the image display device 100 receives a specific application installation command while being connected to the application providing server in operation S525. At this point, the specific application may be an application not installed in the first terminal 200A and the second terminal 200B.

When the control unit 150 of the image display device 100 requests the application installation to the first terminal 200A and the second terminal 200B according to the received application installation command in operation S527, the first terminal 200A and the second terminal 200B install the corresponding application in operation S529. The installation request and installation process of an application will be described with reference to FIGS. 24 and 25.

Figure 24:
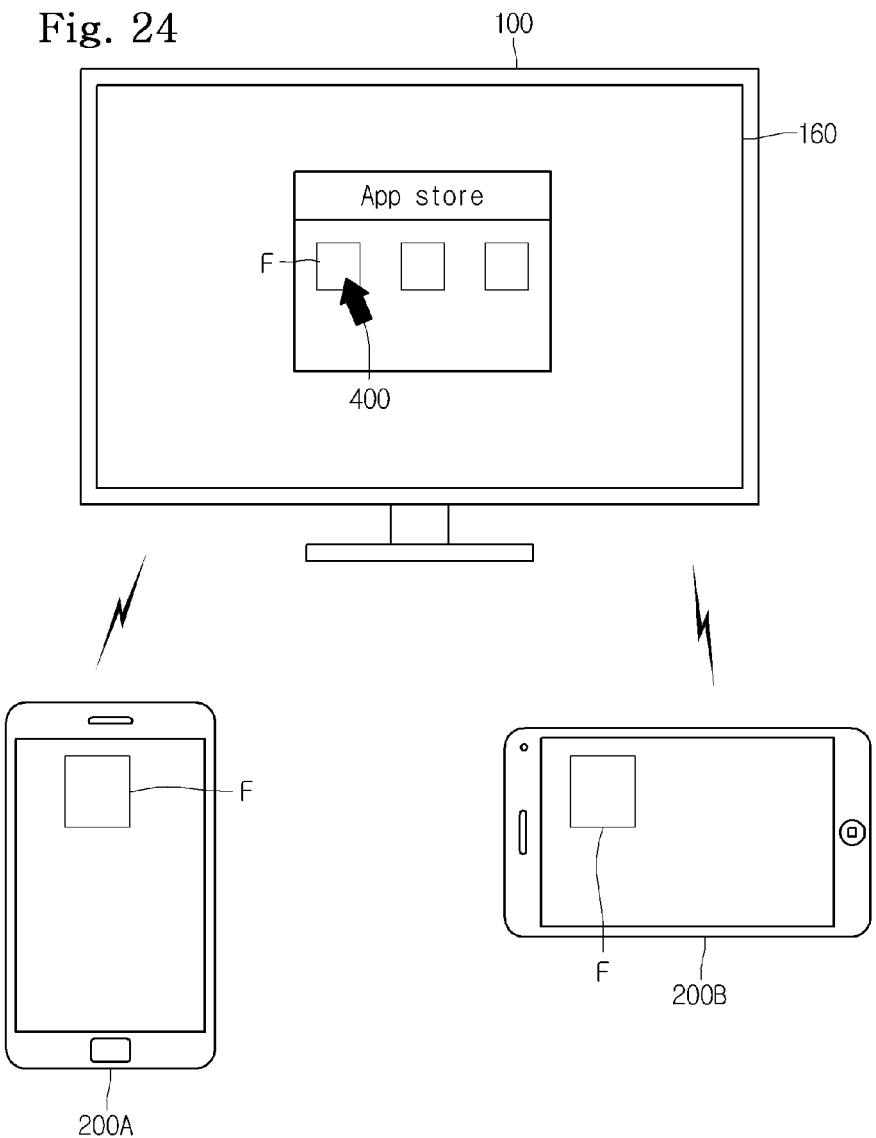
FIG. 24 is a view illustrating a process for installing an application in a terminal in access to an application providing server according to an embodiment of the present invention.
Figure 25:
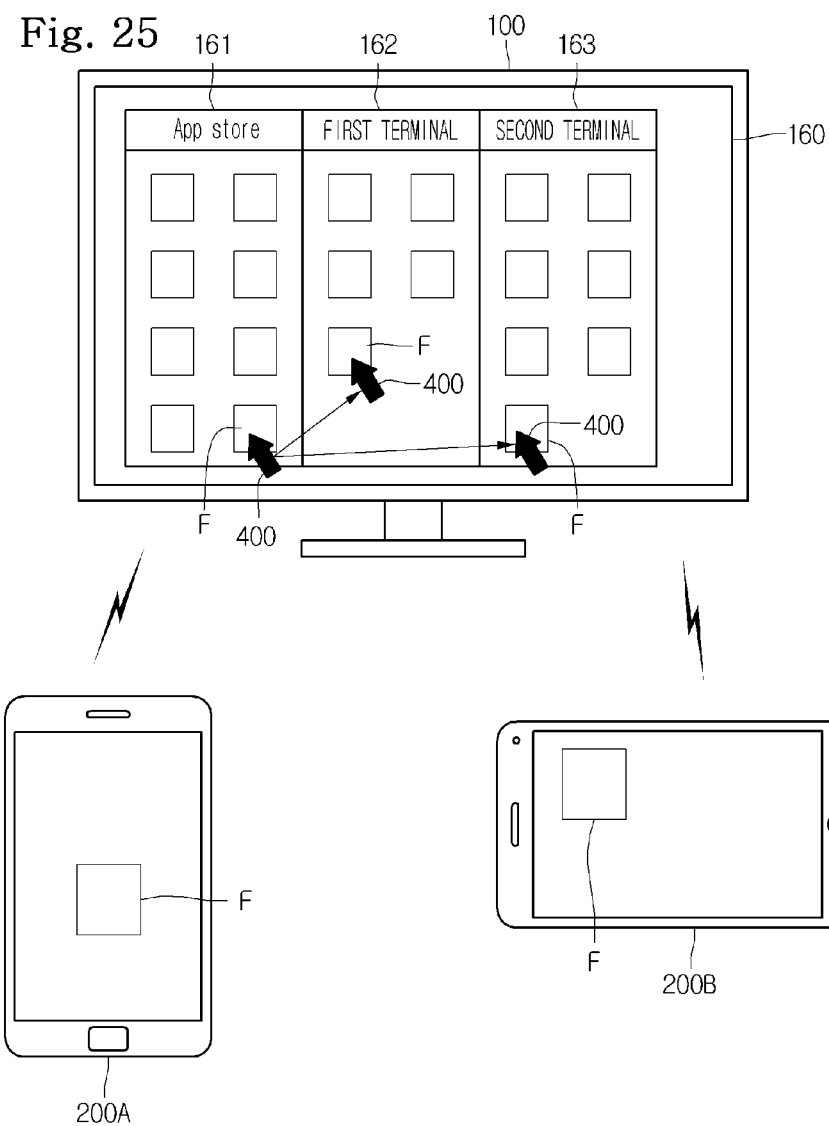
FIG. 25 is a view illustrating a process for installing an application in a terminal in access to an application providing server according to an embodiment of the present invention.

FIG. 24 is a view illustrating a process for accessing an application providing server and installing an application in a terminal 200 according to an embodiment of the present invention. FIG. 25 is a view illustrating a process for accessing an application providing server and installing an application in the terminal 200 according to another embodiment of the present invention.

First, referring to FIG. 24, a user allows the image display device 100 to access the application providing server through the pointer 400 in order to select the icon F of an application not installed in the first terminal 200A and the second terminal 200B. In this case, a user may know an application not installed in the first terminal 100A and the second terminal 200B. When the application icon F is selected by a user's input, the application F may be installed in the first terminal 200A and the second terminal 200B.

Referring to FIG. 25, after a user selects the application icon F of the application proving server in the first application display area 161 through the pointer 400 and performs a drag and drop operation of the second and third application display areas 162 and 163, an application corresponding to the application icon F may be installed in the first and second terminals 200A and 200B.

According to an embodiment of the present invention, an image display device receives information on a terminal connected thereto, and actively manages the information.

Additionally, according to an embodiment of the present invention, as an image display device receives information on application installed in a terminal connected to the image display device, a user may easily utilize the application information on the terminal through the large screen of the image display device.

Moreover, according to an embodiment of the present invention, an application having the most excellent performance among applications installed in a plurality of terminals connected to an image display device may be executed, so that the convenience of a user may be improved.

Furthermore, according to an embodiment of the present invention, a terminal having the fastest communication speed, most inexpensive usage rate, or most excellent charging state among a plurality of terminals connected to an image display device may be used, so that efficient application execution may be possible.

Additionally, according to an embodiment of the present invention, since an image display device stores basic information on previously used application, the application may be easily installed and reused.

The method of controlling an image display device according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and further includes carrier waves (such as data transmission through the Internet.

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an image display device, the method comprising:
   receiving application information from a first terminal connected to the image display device and application information from a second terminal connected to the image display device; and
   displaying, based on the application information received from the first terminal and the application information received from the second terminal, a first area including an identical application among applications installed in the first terminal and the second terminal, a second area including an application installed in only the first terminal and a third area including an application installed in only the second terminal;
   receiving a request for moving the application installed in only the first terminal to the third area; and
   installing the application installed in only the first terminal in the second terminal according to the request.

2. The method of claim 1, wherein the receiving of the application information comprises receiving only information of an application allowed for transmission among applications installed in the first and second terminals.

3. The method of claim 1, further comprising, when one of the first and second terminals is disconnected from the image display device, storing application information of the disconnected terminal.

4. The method of claim 1, further comprising:
   storing the received application information of the first and second terminals;
   when one of the first and second terminals is disconnected from the image display device, deleting the application information of the disconnected terminal.

5. The method of claim 1, further comprising:
   receiving basic information of the first and second terminals;
   confirming operating systems of the first and second terminals are identical on the basis of the received basic information; and
   when the operating systems of the first and second terminals are identical, comparing the received application information.

6. The method of claim 5, further comprising:
   confirming an application corresponding to application information not received from the first and second terminals according to the comparison; and
   installing the confirmed application in the first and second terminals in access to an application providing server.

7. The method of claim 1, further comprising:
   when the identical application is selected, determining which one of the first and second terminals executes an application corresponding to the selected application information; and
   executing the application corresponding to the selected application information by the determined terminal.

8. The method of claim 7, wherein the determining of which one of the first and second terminals comprises determining a terminal having an application of a more recent update version among the first and second terminals according to the received application information.

9. The method of claim 7, wherein the determining of which one of the first and second terminals comprises determining a terminal having a better battery charging state among the first and second terminals according to the received application information.

10. The method of claim 7, wherein the determining of which one of the first and second terminals comprises determining a terminal having a less CPU usage among the first and second terminals according to the received application information.

11. The method of claim 7, wherein the determining of which one of the first and second terminals comprises determining a terminal using a communication method of a less usage rate among the first and second terminals according to the received application information.

12. The method of claim 1, further comprising transmitting the received application information from the first terminal and the received application information from the second terminal to one of the first and second terminals.

13. A non-transitory computer-readable program written recording medium for performing the method of controlling an image display device of claim 1.

14. An image display device comprising:
   a display unit; and
   a control unit configured to:
   receive application information from a first terminal connected to the image display device and application information from a second terminal connected to the image display device,
   control the display unit to display, based on the application information received from the first terminal and the application information received from the second terminal, a first area including an identical application among applications installed in the first terminal and the second terminal, a second area including an application installed in only the first terminal and a third area including an application installed in only the second terminal,
   receive a request for moving the application installed in only the first terminal to the third area, and
   install the application installed in only the first terminal in the second terminal according to the request.

15. The device of claim 14, wherein the control unit receives only information of an application allowed for transmission among applications installed in the first and second terminals.

* * * * *